US010626569B2

United States Patent
Duquette et al.

(10) Patent No.: US 10,626,569 B2
(45) Date of Patent: Apr. 21, 2020

(54) MODULAR VARIABLE-HEAD HYDROELECTRIC ENERGY CONVERSION SYSTEM

(71) Applicant: Littoral Power Systems Inc., New Bedford, MA (US)

(72) Inventors: David Duquette, Monmouth Junction, NJ (US); Chad Cox, Norwood, MA (US)

(73) Assignee: Littoral Power Systems, Inc., New Bedford, MA (US)

( * ) Notice: Subject to any disclaimer, the term of this patent is extended or adjusted under 35 U.S.C. 154(b) by 37 days.

(21) Appl. No.: 15/767,596

(22) PCT Filed: Oct. 14, 2016

(86) PCT No.: PCT/US2016/057162
§ 371 (c)(1),
(2) Date: Apr. 11, 2018

(87) PCT Pub. No.: WO2017/066655
PCT Pub. Date: Apr. 20, 2017

(65) Prior Publication Data
US 2018/0291581 A1 Oct. 11, 2018

Related U.S. Application Data

(60) Provisional application No. 62/241,553, filed on Oct. 14, 2015.

(51) Int. Cl.
*E02B 9/02* (2006.01)
*F03B 13/08* (2006.01)
(Continued)

(52) U.S. Cl.
CPC ............ *E02B 9/02* (2013.01); *E02B 9/025* (2013.01); *F03B 3/04* (2013.01); *F03B 13/08* (2013.01);
(Continued)

(58) Field of Classification Search
CPC .......... F05B 2230/60; F05B 2240/142; F05B 2240/40; E02B 9/025; E02B 9/02; F03B 13/08; F03B 15/06
(Continued)

(56) References Cited

U.S. PATENT DOCUMENTS

| 1,684,469 | A | * | 9/1928 | Buda | F03B 17/061 |
| | | | | | 415/24 |
| 3,922,012 | A | * | 11/1975 | Herz | F03B 17/065 |
| | | | | | 290/43 |

(Continued)

OTHER PUBLICATIONS

International Search Report and Written Opinion for PCT/US2016/057162, dated Dec. 22, 2016.

*Primary Examiner* — Charles Reid, Jr.
(74) *Attorney, Agent, or Firm* — Foley & Lardner LLP

(57) ABSTRACT

A system includes first and second dam modules, a power generation unit, and first and second turbine modules. The first dam module can be secured to a foundation of a dam site and redirect a first flow of water. The second dam module can be secured to the first dam module opposite the foundation and redirect a second flow of water. The first turbine module can be secured to the foundation. The second turbine module can be secured to the first turbine module opposite the foundation. The power generation unit includes a turbine to be driven by a third flow of water at least partially including at least one of the first flow of water or the second flow of water. The first turbine module includes a draft tube having an inlet to receive water from the turbine and an outlet to discharge water from the first turbine module.

20 Claims, 18 Drawing Sheets

(51) Int. Cl.
*F03B 15/04* (2006.01)
*F03B 3/04* (2006.01)
*F03B 15/06* (2006.01)

(52) U.S. Cl.
CPC .............. *F03B 15/04* (2013.01); *F03B 15/06* (2013.01); *F05B 2230/60* (2013.01); *F05B 2240/142* (2013.01); *F05B 2240/40* (2013.01); *Y02E 10/22* (2013.01); *Y02E 10/223* (2013.01); *Y02E 10/226* (2013.01); *Y02P 70/525* (2015.11)

(58) Field of Classification Search
USPC .................................. 290/43, 54; 405/78, 87
See application file for complete search history.

(56) References Cited

U.S. PATENT DOCUMENTS

| | | | | |
|---|---|---|---|---|
| 4,134,707 | A * | 1/1979 | Ewers | F03D 3/02 415/4.2 |
| 4,317,330 | A * | 3/1982 | Brankovics | F03B 17/061 290/54 |
| 4,345,159 | A * | 8/1982 | Gutierrez Atencio | F03B 13/08 290/43 |
| 4,476,396 | A * | 10/1984 | Calvert, Jr. | F03B 13/08 290/42 |
| 4,540,313 | A | 9/1985 | Broome | |
| 4,573,827 | A * | 3/1986 | Mayo, Jr. | F03B 13/08 290/43 |
| 4,804,855 | A | 2/1989 | Obermeyer | |
| 6,237,537 | B1 | 5/2001 | Winchester | |
| 6,269,287 | B1 * | 7/2001 | March | E02B 5/085 405/87 |
| 7,215,036 | B1 * | 5/2007 | Gehring | F03B 17/061 290/54 |
| 7,278,273 | B1 | 10/2007 | Whitted et al. | |
| 8,123,482 | B2 * | 2/2012 | Achard | F03B 17/063 415/122.1 |
| 8,125,096 | B2 * | 2/2012 | Shifrin | F03B 3/06 290/52 |
| 8,308,424 | B2 * | 11/2012 | Park | F03B 13/26 290/54 |
| 2005/0285407 | A1 | 12/2005 | Davis et al. | |
| 2006/0078388 | A1 | 4/2006 | Obermeyer | |
| 2008/0157528 | A1 * | 7/2008 | Wang | F03D 9/17 290/43 |
| 2009/0115193 | A1 * | 5/2009 | Branco | F03B 13/10 290/54 |
| 2009/0212572 | A1 | 8/2009 | Sundermann | |
| 2009/0230686 | A1 | 9/2009 | Catlin | |
| 2011/0091312 | A1 * | 4/2011 | Park | F03B 11/00 415/73 |
| 2013/0266378 | A1 | 10/2013 | French, Sr. | |
| 2013/0320678 | A1 * | 12/2013 | Kittel | F03B 3/18 290/54 |
| 2015/0033722 | A1 * | 2/2015 | Layton | F03B 15/14 60/327 |
| 2015/0048619 | A1 * | 2/2015 | Lin | F03B 13/264 290/54 |

* cited by examiner

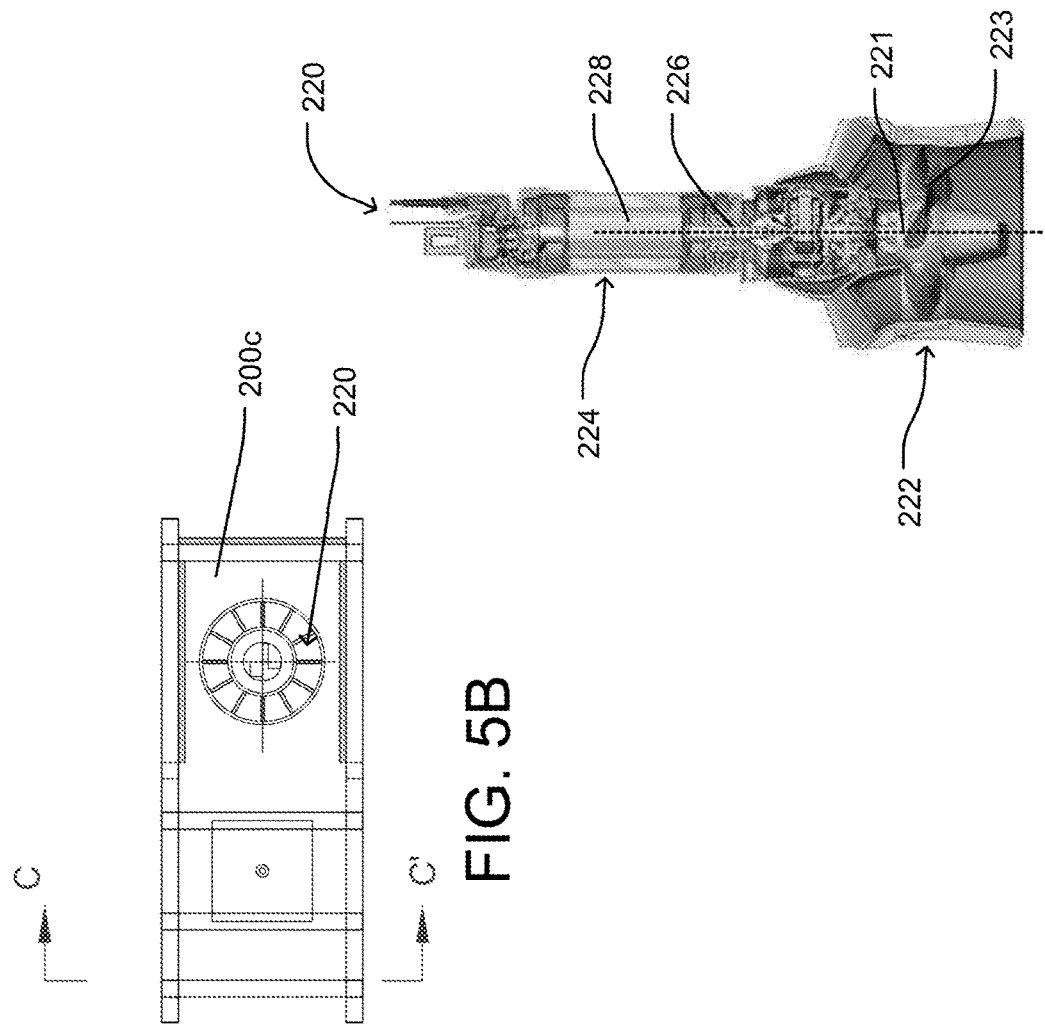
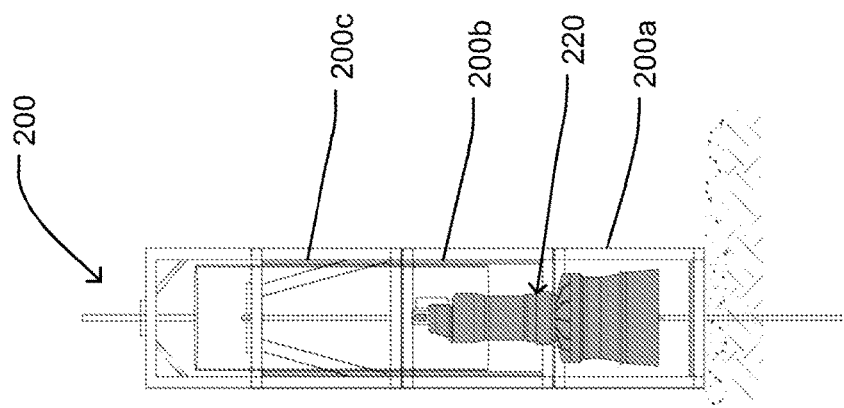
FIG. 5B
FIG. 5D
FIG. 5C

MODULAR VARIABLE-HEAD HYDROELECTRIC ENERGY CONVERSION SYSTEM

CROSS-REFERENCE TO RELATED APPLICATIONS

The present application claims the benefit of and priority to International Patent Application No. PCT/US2016/057162, titled "A MODULAR VARIABLE-HEAD HYDROELECTRIC ENERGY CONVERSION SYSTEM," filed Oct. 14, 2016, which claims the benefit of and priority to U.S. Provisional Patent Application No. 62/241,553, titled "MODULAR VARIABLE-HEAD HYDROELECTRIC ENERGY CONVERSION SYSTEM," filed Oct. 14, 2015, which are incorporated herein by reference in its entirety for all purposes.

TECHNICAL FIELD

The present application relates to hydroelectric energy systems, and more particularly to systems and methods for modular variable head hydroelectric energy conversion.

BACKGROUND OF DISCLOSURE

Many available hydropower sites in the USA and globally have environmental and social sustainability challenges that can be partly addressed by run-of-the-river (ROR) projects, considered environmentally friendly because of their modest impoundments and imposition of minimal downstream hydrographic changes. Cost is one of the major problems with harnessing this potential. Installation costs (usually expressed as ICC, or initial capital cost) represent a significant contribution to the cost of energy developed over the lifetime of a hydropower installation. It represents a critical barrier to the development of many low-head and low-power sites. However, most low-head power installations take years to deploy, also inflating costs, and when removed leave behind a lasting environmental impact.

SUMMARY OF DISCLOSURE

Embodiments of the present solution are directed to systems and methods for a modular low head hydropower system, scalable from approximately 7 to 50 ft. of net head depending on the type of deployment. In some implementations, the system is designed for small hydro projects, and in particular, ROR applications where the powerhouse is located contiguous with the dam. The components of the system can be mounted, transported and partially deployed in a manner consistent with that of standard shipping containers. The actual structural components of the system can be in the dimensional form factor of standard ISO shipping containers but with structural members suitable for the loads imposed on a water-impounding structure.

In some embodiments, the individual modules of the system incorporate standardized connectors which facilitate shipping from a factory fabrication site, placement at the dam site, and initial interconnection. The dam modules can be constructed as open frames without permanent skin plates, which simplifies construction "in the wet" with reduced cofferdam requirements. In some embodiments, a modular system allows for low-impact installations that, when removed, leave little if any perceptible trace. The systems can be grid-connected or used to develop non-grid project- or community-specific power.

The low cost, prefabricated modules can safely function as dams. They are structurally adequate, they are globally stable, seepage can be strictly controlled, extreme flow can be safely conveyed through the modular spillway design, and they have ample provisions for turbine/generator connection.

The systems and methods of the present solution provide for integrated dam modules made of steel or other materials, turbine modules, and spillway modules. Water impoundment is provided by removable stop shutters, low-leakage joints, and foundation seepage controls.

In some implementations, a system includes a first dam module, a second dam module, a power generation unit, a first turbine module, and a second turbine module. The first dam module has a first side configured to be secured to a foundation of a dam site. The first dam module is configured to redirect a first flow of water from a first surface of the first dam module. The second dam module is configured to be secured to a second side of the first dam module opposite the foundation. The second dam module is configured to redirect a second flow of water from a second surface of the second dam module. The first turbine module has a third side configured to be secured to the foundation. The second turbine module is configured to be secured to a fourth side of the first turbine module opposite the foundation, the first turbine module and the second turbine module cooperating to contain the power generation unit. The power generation unit includes a turbine configured to be driven by a third flow of water, the third flow of water at least partially including at least one of the first flow of water or the second flow of water redirected by the respective dam module, and a generator configured to generate electricity responsive to motion of the turbine. The turbine is oriented to rotate about a rotational axis perpendicular to the third side of the first turbine module. The first turbine module includes a draft tube having a tube inlet oriented to receive water from the turbine and a tube outlet oriented perpendicular to the rotational axis to discharge water from the first turbine module.

In some implementations, a method of installing a modular dam system includes placing a first dam module on a first plurality of piles deployed into a foundation of a dam site. The first dam module is configured to redirect a first flow of water from a first surface of the dam module. The method includes securing a second dam module on a side of the first dam module opposite the foundation. The second dam module is configured to redirect a second flow of water from a second surface of the second dam module. The method includes placing a first turbine module on a second plurality of piles deployed into the foundation of the dam site. The first turbine module is configured to receive a third flow of water to generate electricity. The third flow of water at least partially includes at least one of the first flow of water or the second flow of water redirected by the respective dam module. The first turbine module includes a draft tube having a tube inlet and a tube outlet oriented perpendicular to a bottom surface of the first turbine module to discharge water from the first turbine module. The method includes securing a second turbine module a side of the first turbine module opposite the foundation. The method includes securing a first end of an anchor to the foundation and a second end of the anchor to an anchor plate on a side of the second dam module opposite the foundation.

BRIEF DESCRIPTION OF THE FIGURES

The foregoing and other objects, aspects, features, and advantages of the present solution will become more apparent and better understood by referring to the following description taken in conjunction with the accompanying drawings, in which

FIG. 5B is a plan view of an embodiment of the turbine module stack of FIG. 5A.

FIG. 5C is a section view of an embodiment of the turbine module stack of FIG. 5A.

FIG. 5D is a cross section view of an embodiment of a power generation unit of the turbine module stack of FIG. 5A.

Figure 1A:
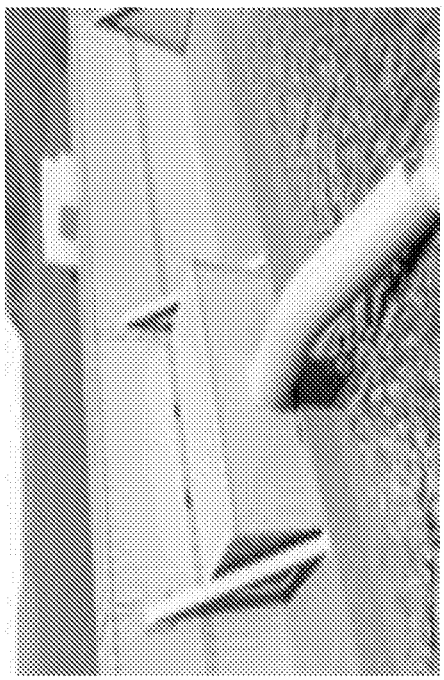
FIGS. 1A-1D are diagrams of embodiments of a modular form factor low head hydropower system.
Figure 1B:
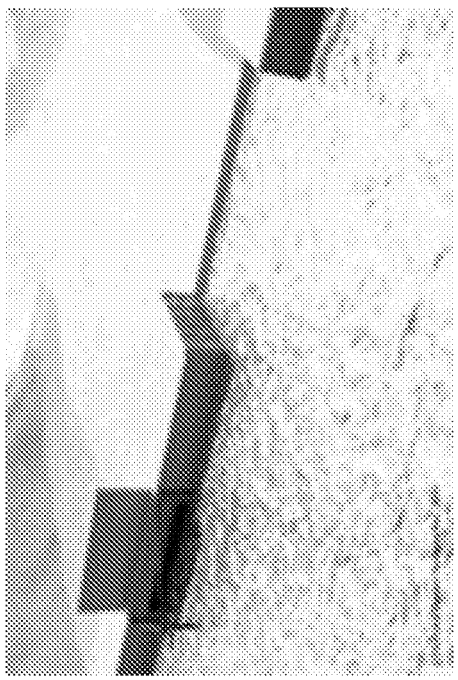
Figure 1C:
Figure 1D:
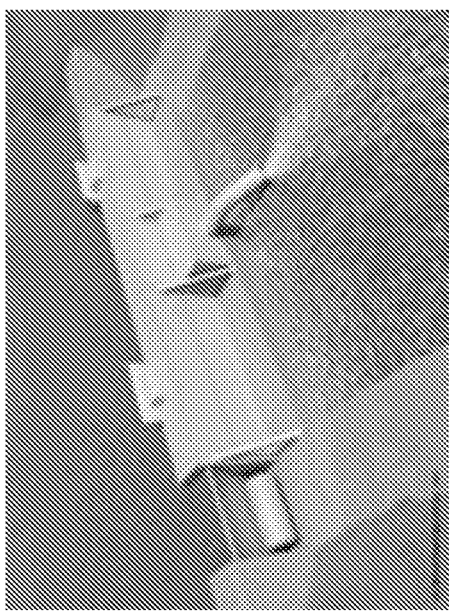

The features and advantages of the present solution will become more apparent from the detailed description set forth below when taken in conjunction with the drawings, in which like reference characters identify corresponding elements throughout. In the drawings, like reference numbers generally indicate identical, functionally similar, and/or structurally similar elements.

DETAILED DESCRIPTION

The systems and methods of the present solutions are directed to a prefabricated, modular, low-head hydropower system based on the innovative use of a modular form factor based on that of a standard shipping container. The combination of low cost equipment, quality-controlled factory fabrication, and rapid deployment (based on shipping container logistics and pre-fabricated modules) is expected to yield a significant reduction in civil works costs, as against contemporary technologies, leading to a reduction in levelized cost of energy (LCOE) developed by a hydropower installation.

In some embodiments, a system includes a first dam module, a second dam module, a power generation unit, a first turbine module, and a second turbine module. The first dam module has a first side configured to be secured to a foundation of a dam site. The first dam module is configured to redirect a first flow of water from a first surface of the first dam module. The second dam module is configured to be secured to a second side of the first dam module opposite the foundation. The second dam module is configured to redirect a second flow of water from a second surface of the second dam module. The first turbine module has a third side configured to be secured to the foundation. The second turbine module is configured to be secured to a fourth side of the first turbine module opposite the foundation, the first turbine module and the second turbine module cooperating to contain the power generation unit. The power generation unit includes a turbine configured to be driven by a third flow of water, the third flow of water at least partially including at least one of the first flow of water or the second flow of water redirected by the respective dam module, and a generator configured to generate electricity responsive to motion of the turbine. The turbine is oriented to rotate about a rotational axis perpendicular to the third side of the first turbine module. The first turbine module includes a draft tube having a tube inlet oriented to receive water from the turbine and a tube outlet oriented perpendicular to the rotational axis to discharge water from the first turbine module.

Referring to FIG. 1, embodiments of a modular form factor low head hydropower system are illustrated in two different deployment scenarios. The ROR project of FIG. 1A shows diverted flow, but can also be river/canal based. The use of a submersible turbine/generator unit allows the primarily mechanical and electrical system to be easily removed and replaced for maintenance and repair, thus minimizing outage time minimize replacement or maintenance time. The dam-toe scheme depicted in FIGS. 1B-1D shows a powerhouse downstream of the dam and a short penstock that penetrates through the dam to convey water form intake to turbine. It also shows the initial implementation for a low head impoundment and concrete footings.

Referring further to FIGS. 1A-1D, an embodiment of a baseline dam configuration is shown. The dam configuration is shown to be three containers (or modules) high, having a form factor analogous to a 40 foot high-cube ISO container. Each module can be 8' wide by 9.5' high, stacked on top of each other and oriented with the long axis parallel to the flow. By orienting the modules with the long axis (e.g., longitudinal axis) parallel to the flow of water, the dam configuration has an increased ability to withstand and resist hydrostatic forces, which in many deployments can obviate the need for a cofferdam.

By using prefabricated modules having a form factor analogous to an ISO container, systems according to the present disclosure can have features such as very low environmental impact, very low cost, quick installation, scalability, do not require specialized equipment or personnel, and can be easily installed by basic construction crews worldwide. For example, the modules can be easily manipulated or transported by existing devices configured for use with ISO containers. In some embodiments, the containers include corner blocks (e.g., corner connector blocks) that enable fast alignment during construction. In some embodiments, twist locks are used for transport and assembly, but corner connector blocks are used to transport modules and align the components for quick through-bolted and post-tensioned assembly (see further herein for description of anchoring and tensioning), as the twist-locks may lead to difficult seepage problems and/or cause structural concerns. In some embodiments, the modules having an exterior container form of an ISO container or analogous to an ISO container. The form factor of various embodiments of the modules or containers is described further herein.

In some embodiments, the bottom dam module includes a bottom slab (e.g., a concrete slab) which transfers and distributes stress into the foundation material. The bottom slab can be connected to piles driven into the foundation.

In some embodiments, piles driven into the foundation soils immediately upstream and downstream of the bottom unit provide for underflow seepage control by lengthening the seepage flow paths. The piles can be steel sheet piles. The piles can also protect against undermining of the dam components due to foundation undercutting erosion. In some embodiments, the sheet piles are connected to the bottom module base slab via grout sills.

In some embodiments, the middle module provides the reaction point for the post-tensioned tie-down anchor. The tie-down anchor is a double corrosion protected steel rod which is installed in a hole drilled into the foundation and grouted into place. The tie-down rod is then tensioned via a temporary jack and the top is locked off on a reaction plate which transfer the stress into the dam modules below the anchor assembly. This post-tension load allows the system to resist the sliding and overturning forces created by the hydrostatic and other loads on the dam.

In some embodiments, the framing of all modules consists of steel members with a hollow square section (HSS members). All modules can be connected to vertically and horizontally adjacent modules via threaded tie-rods through the HSS members.

In some embodiments, decking on the top of the top module allows access across the dam and to the turbine/generator modules.

The modules of the turbine stack are modified from the basic dam module stack. Turbine orientation is vertical. The bottom module of the turbine stack contains a 90 degree transition draft tube which discharges in the downstream direction. The vertical submersible turbine/generator unit mates with the draft tube from above. A cylindrical gate is raised and lowered to provide flow control to each turbine/generator unit. Multiple units linked to a programmable logic controller (PLC) provide for run-of-the-river flow control by sequentially opening or closing cylindrical gates in response to variations in impoundment elevation. At sites where sufficient tailwater depth is not available to maintain draft tube submergence, a downstream line of steel sheet piles will be used to raise tailwater elevation and also provide a plunge pool for mitigation of potential erosion from spillway discharges.

The spillway module is a flat frame without vertical posts that is connected on top of dam modules below. Flow control is provided by a bottom-hinged crest gate which is the width of the module (8 feet). Multiple spillway modules can be ganged together along the axis of the dam to increase spillway width as needed. Spillway control is via pneumatic actuation of the gates. Spillway operations to provide additional discharge during flood flows occurs by reducing pneumatic pressure to the gate controllers by means of a PLC command in response changes in impoundment elevation.

In some aspects, there are at least three basic strategies, arrangements, or configurations for implementing the modular components to achieve head heights up to 50 feet.

A first strategy is to construct new ROR dams where the modules are stacked two or three high, providing a maximum usable head of approximately 19 or 28.5 feet respectively.

A second strategy is to use the penstock/turbine and/or spillway modules to retrofit existing unpowered impoundments (with maximum heads also on the order of 19 to 28.5 ft), providing an opportunity to harvest power without any additional environmental impact due to new impoundments.

A third strategy is to use the modular components to construct a dam or weir across all or part of the river channel with the intention of creating additional head in a bypass reach by the construction of a canal, pipe or tunnel constructed downstream of the dam structure and upstream of the powerhouse module. This is the so-called "alpine" configuration. In some embodiments—referred to herein as "alpine" cases—it may also be desirable to build penstock/turbine modules into the dam structure itself (similar to the baseline configuration), so the dam can operate in phases depending on river flow to prevent environmental impacts due to removal of flow from a significant stream reach.

The systems and methods of the present solution offer many advantages to accelerate deployment and decrease installation costs. It is based at least in part on commercially available, proven technologies. The modules are configured to be dimensionally identical to ISO standard intermodal shipping containers to facilitate shipping and handling. Pre-fabricated modules (e.g. turbine/penstock, spillway and dam) form "building blocks" which are manufactured in a quality controlled environment. These building blocks can then be quickly assembled on-site to minimize costs and risks of construction in variable riverine environments. Installation of tie-down anchors and sheet pile seepage cutoffs is a rapid process that efficiently utilizes the same crane used to place the modules. Anchors are drilled in from the top of the containers. Sheet piles are installed "in the wet" and provide for initial phase water control needed to prepare the river bed subgrade, after which the modules themselves are placed directly into a waterway between the sheet pile lines without the need for an additional cofferdam. The sheet piles are then incorporated into the final structural system as the foundation seepage control system. These factors substantially reduce the time to complete a system installation when compared to conventional concrete or earth fill construction techniques. While each existing dam site or potential new development location is unique, the modular nature of the system is uniquely adaptable for a wide range of topographic and subsurface conditions. This approach provides for both cost and schedule advantages over traditional hydropower system construction methods.

Figure 2A:
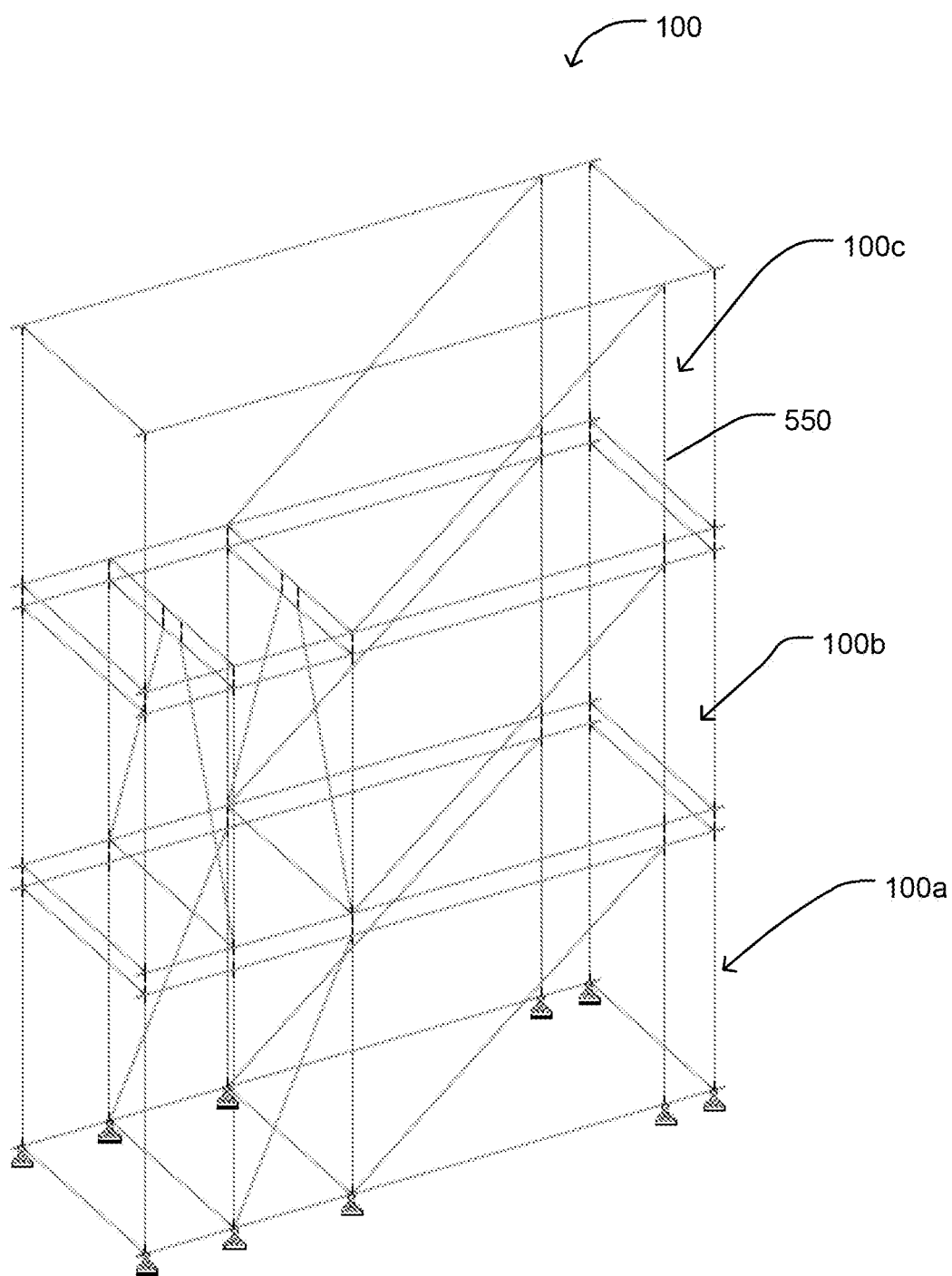
FIG. 2A is a perspective view of an embodiment of a dam module stack of a modular dam system
Figure 2B:
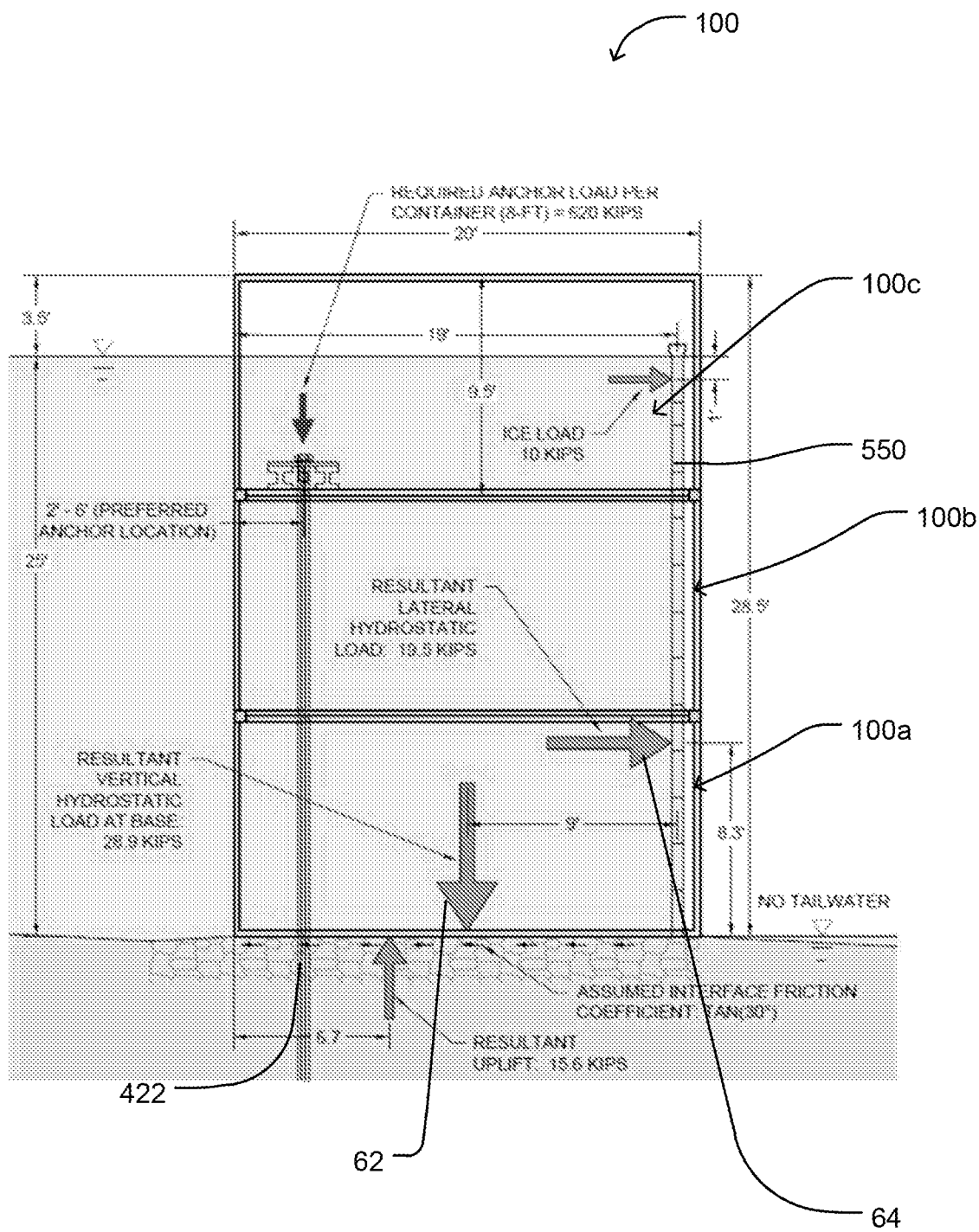
FIG. 2B is a schematic diagram of an embodiment of a dam module stack of a modular dam system, the dam module stack configured to maintain stability in response to external forces.

Referring now to FIGS. 2A-2B, a dam module (or container) stack 100 is shown according to various embodiments of the present disclosure. The dam module stack 100 includes a first dam module 100a, a second dam module 100b, and a third dam module 100c. The dam module stack 100 is configured to prevent a flow of water from flowing through one or more of the dam modules, and/or redirect the flow of water. The dam module stack 100 can include one or more stop logs 550 configured to redirect, modify, control, prevent, or stop the flow of water.

Referring further to FIG. 2B, in some embodiments, the stop logs 550 are included in and/or are configured to cooperate with an anchor system configured to anchor, secure, and/or attach the dam module stack 100 to a foundation, while also stabilizing a modular dam system that includes the dam module stack 100 against hydrodynamic forces or other forces. The anchor system can include an anchor 422 and the stop logs 550, which are configured and/or positioned to stabilize the modular dam system (e.g., balance, resist forces, redistribute forces from the modular dam system to the foundation, abutments, or other portions of the dam site). For example, the flow of water can cause a vertical hydrostatic load 62 against a base of the first dam module 100a and a horizontal hydrostatic load 64 against the stop logs 550 that can be stabilized due to forces or loads provided by the anchor 422 (e.g., a downward force on the dam module stack 100 due to the anchor 422 contributes to a horizontal friction between the dam module stack 100 and material below the dam module stack 100, acting against the horizontal hydrostatic load 64).

Figure 3A:
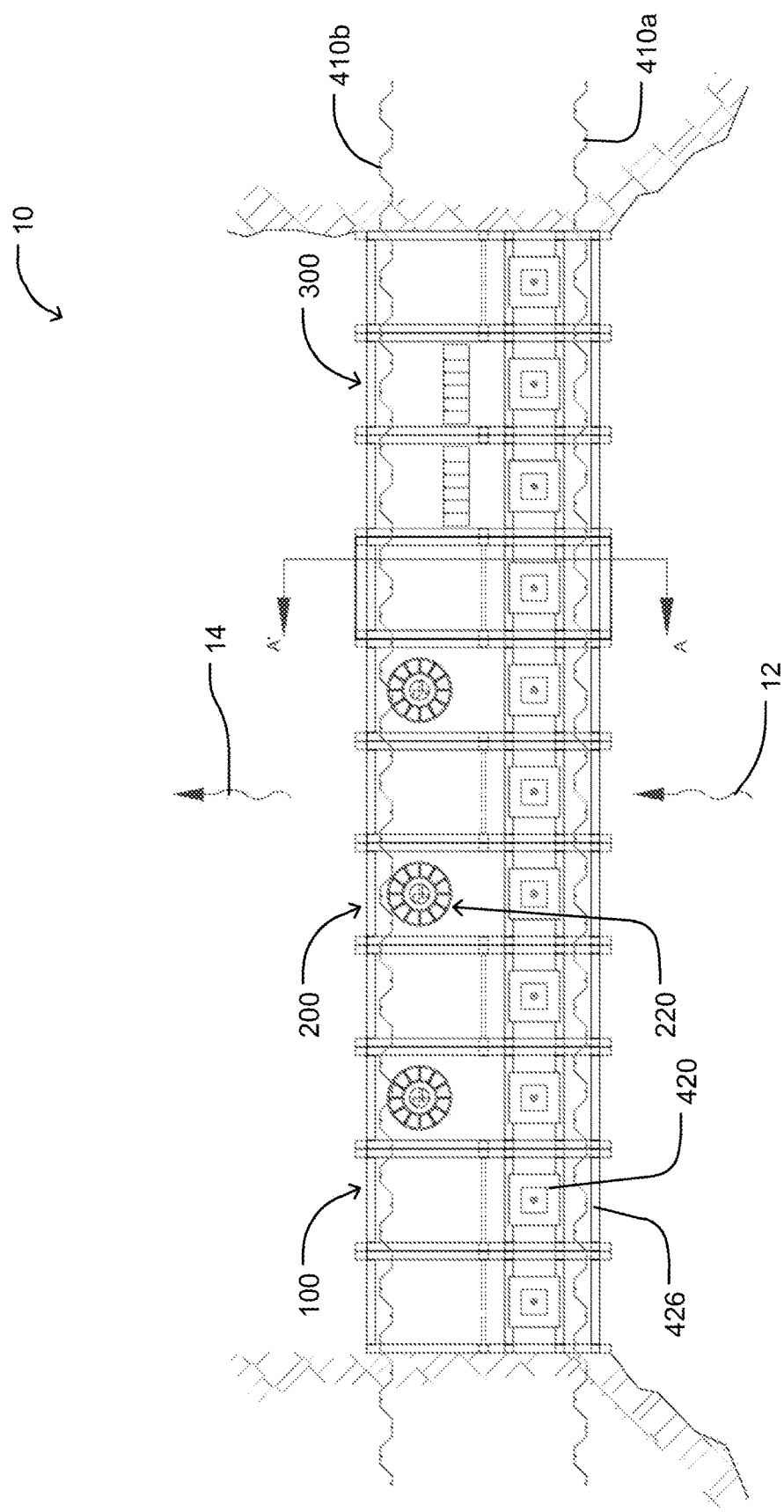
FIG. 3A is a plan view of an embodiment of a modular dam system.
Figure 3B:
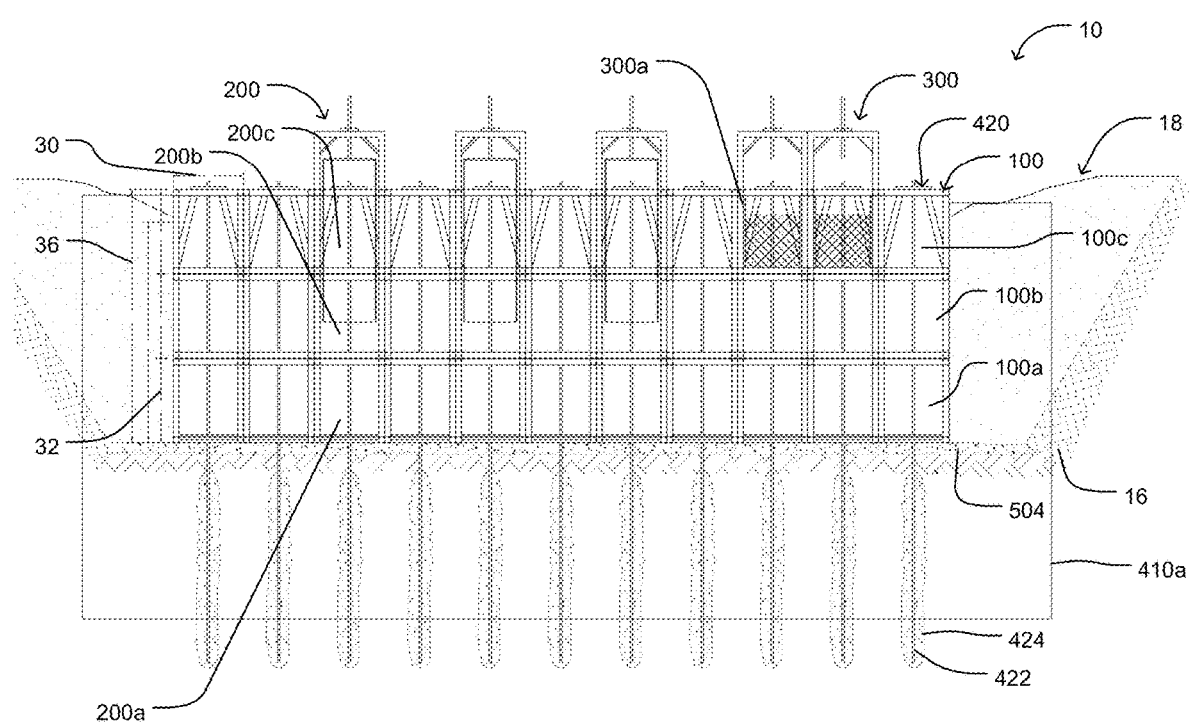
FIG. 3B is an elevation view of an embodiment of the modular dam system of FIG. 3A.

Referring now to FIGS. 3A and 3B, a dam system 10 is shown according to various embodiments of the present disclosure. The dam system 10 is configured to be installed at a water source, which can result in an upstream flow of water 12 on an upstream side of the dam system 10, and a downstream flow of water 14 on a downstream side of the dam system 10. The dam system 10 is configured to generate electricity based on potential energy and/or kinetic energy of the water source. The dam system 10 (or modules thereof) is configured to be installed on a foundation of a dam site, such as by being placed on or secured to piles driven into the foundation, and by being anchored to the foundation. In some installation configurations, the foundation 18 includes foundation soilrock 504. A grouted gravel or poured concrete base 16 may be located, placed, or installed between the dam system 10 and the foundation soilrock 504.

In some embodiments, the dam system 10 includes one or more modules or containers, such as dam modules, turbine modules, and/or spillway modules. The modules of the dam system 10 can be organized into stacks of modules or containers having similar functions (e.g., a dam module stack, a turbine module stack). The modules of the dam system 10 can be installed in layers, such as a first layer having dam modules and turbine modules, and a second layer having dam modules, turbine modules, and/or spillway modules. A third layer may also be provided, having dam modules, turbine modules, and/or spillway modules. In various embodiments, the number and arrangement of the various types of modules can vary, and can be selected based on factors including conditions of the water flow, the foundation, and any abutments around the dam system 10. While the FIGURES described herein illustrate the dam system 10 having three layers, in various embodiments, the dam system 10 is arranged in two layers (e.g., a first layer of first dam modules 100a and first turbine modules 200a, and a second layer of second dam modules 100b, second turbine modules 200b, and spillway modules 300a). Dam module stacks 100 or spillway module stacks 300 may be alternated with turbine module stacks 200, or several dam module stacks 100 and/or spillway module stacks 300 may be placed adjacent to one another and several turbine module stacks 200 also placed adjacent to one another. The modules within a stack may also include openings to fluidly couple to other modules within the stack.

As shown in FIGS. 3A-3B, the dam system 10 includes a dam module stack 100 including a first dam module 100a, a second dam module 100b, and a third dam module 100c; a turbine module stack 200 including a first turbine module 200a, a second turbine module 200b, and a third turbine module 200c; and a spillway stack including a first dam module 100a, a second dam module 100b, and a spillway module 300a. The modules can have a module width 30 (e.g., 8 feet; greater than or equal to 6 feet and less than or equal to 10 feet), a module height 32 (e.g., 9.5 feet; greater than or equal to 7 feet and less than or equal to 12 feet), and a three-module height 36 (e.g., 28.7 feet; greater than or equal to 20 feet and less than or equal to 40 feet), when installed. The turbine stack 200 is configured to house or contain a power generation unit 220 (e.g., a turbine and generator operatively coupled to the turbine). The power generation unit 220 may be located on a downstream side of the turbine stack 200 and may be vertically oriented (e.g., the turbine rotates in a direction perpendicular or substantially perpendicular to the direction of water flow, the longitudinal axis of the modules, and/or to a bottom surface of the modules).

In some embodiments, the dam system 10 includes the anchor 422 installed, secured, and/or driven into grout 424 below the dam system 10, and then secured to an anchor assembly 420 on an opposite side of a corresponding module stack from the foundation 18 (e.g., on top of the module stack). An anchor bar 426 may also run along the modules.

In some embodiments, the dam system 10 is configured to be secured to piles in or on the foundation 18. A pile cutoff region may be defined about the dam system 10. Sheeting 410a may be installed on an upstream side of the dam system 10, and sheeting 410b installed on a downstream side of the dam system 10. The sheeting (e.g., piles or a plurality of piles) may be installed based on a depth of water downstream of the first turbine module 200a. For example, if the depth of water downstream of the first turbine module 200a is less than a threshold value for maintaining a submergence level for the first turbine module 200a (or the power generation unit 220), the sheeting or other piles may be installed.

The dam system 10 can include an access deck 510 across a top of the dam system 10, allowing operators and other personnel access to the various modules of the dam system 10. The access deck 510 can include or be coupled to rails 512.

Further Aspects and Implementations of a Dam Module

Figure 4A:
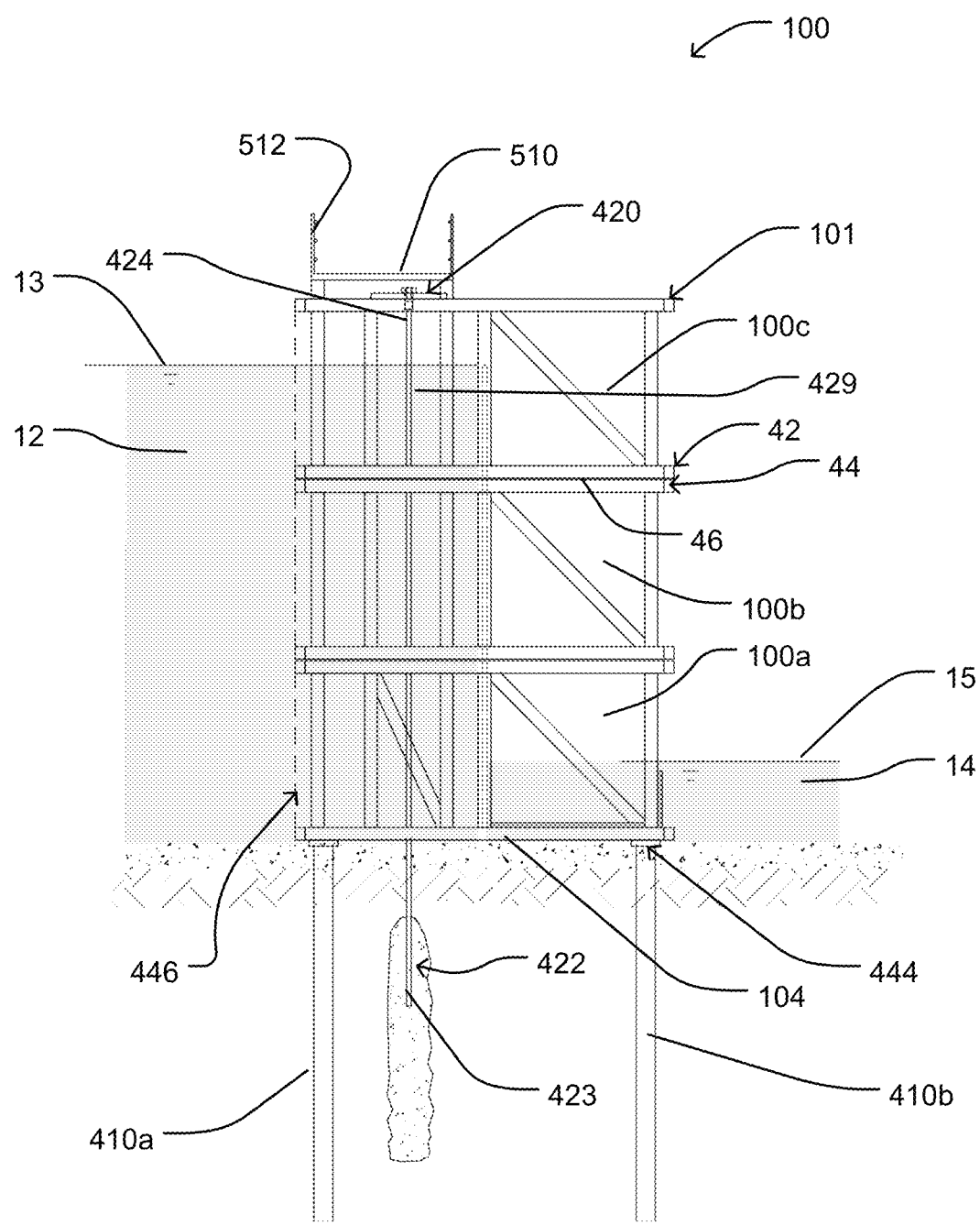
FIG. 4A is a side view of an embodiment of a dam module stack of the modular dam system of FIG. 3A.
Figure 4B:
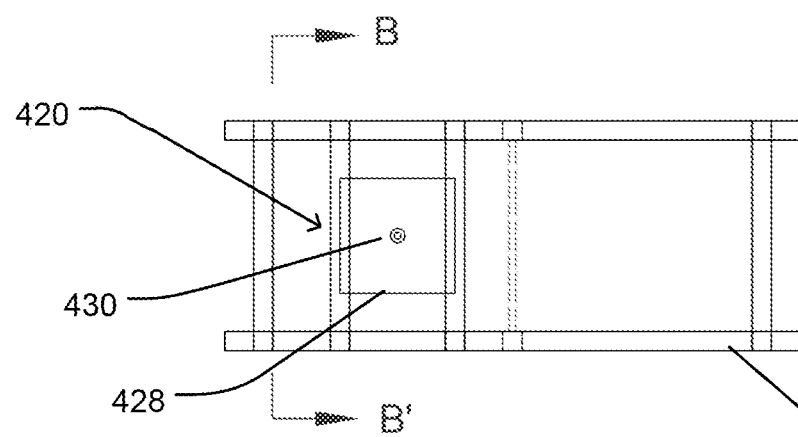
FIG. 4B is a plan view of an embodiment of the dam module stack of FIG. 4A.
Figure 4C:
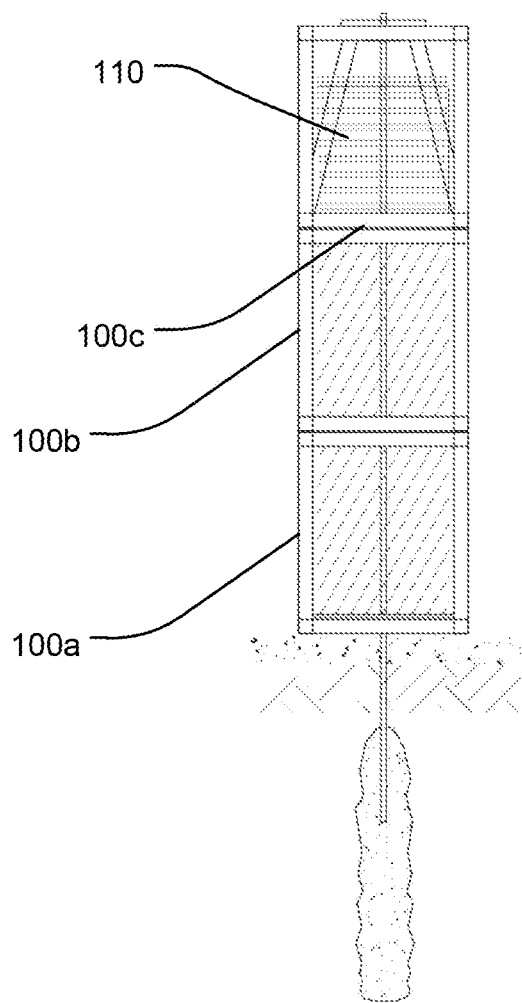
FIG. 4C is a section view of an embodiment of the dam module stack of FIG. 4A.

Referring now to FIGS. 4A-4C, the dam module stack 100 is shown according to various embodiments of the present disclosure. As described previously, the dam module stack 100 can include the first dam module 100a, the second dam module 100b, and the third dam module 100c. The dam modules are configured to prevent water from flowing through the respective dam module, and/or to redirect a flow of water from the surface of the dam modules (e.g., redirect the upstream flow of water 12 shown in FIG. 3A). In other words, the dam modules prevent water from flowing across or past the dam system 10; the water may be redirected to openings in the dam system 10, such as openings that are fluidly coupled to the turbine modules such that the turbine modules may generate electricity based on the kinetic and/or potential energy of the water flow. The dam modules may include a solid or uninterrupted upstream side surface, and/or an actuable upstream side surface, such as a shutter, that can be controlled or actuated to allow or prevent water from passing through the dam module.

Each module can include a frame 101 shaped and/or sized in a manner analogous to an ISO container (e.g., similar or identical height, width, and length). The first dam module 100*a* can be configured to be secured to the foundation. The first dam module 100*a* can include or be placed on or secured to a bottom slab 104 (e.g., a concrete slab). The bottom slab 104 can distribute the weight of the dam system 10 and/or forces applied to the dam system 10 to the foundation, increasing stability of the dam system 10. The bottom slab 104 can be connected to the sheeting 410*a*, 410*b* by a sheetpile head assembly 444, which can help stabilize the dam system 10 on the sheeting 410*a*, 410*b* and the foundation.

In some embodiments, the anchor 422 is coupled to the anchor assembly 420. The anchor assembly 420 can include a plate (e.g., reaction plate, anchor bearing plate) 428 and one or more anchor load transfer beams 430. The anchor assembly 420 can stabilize the dam system 10 by distributing forces between the dam system 10 and the foundation to which the anchor 422 is secured.

In some embodiments, one or more of the dam modules includes a stop shutter 110. For example, as shown in FIG. 4C, the third dam module 100*c* includes the stop shutter 110. The stop shutter 110 can be a gate or other shutter device configured to be moved up or down to control a flow of water through the third dam module 100*c*.

The dam module stack 100 (or other module stacks) can include or be positioned next to a trash rack 446. The trash rack 446 can be a barrier (e.g., a meshed or gridded barrier) sized or configured to prevent trash, debris, or other material from entering the dam system 10, including preventing such material from entering the turbine modules to prevent damage to the power generation unit 220 and/or components thereof.

The dam system 10 can include module connectors configured to secure, attach, join, or otherwise couple or connect the modules to one another. For example, the dam system 10 can include vertical connectors 42 and horizontal connectors 44, such as the corner block connectors described herein, for connecting modules in a top/bottom and side-to-side manner, respectively. In addition, the dam system 10 can include vertical joint seals 46 between modules of a module stack, and horizontal joint seals 48 between modules adjacent to one another (e.g., side-to-side adjacent).

Referring further to FIG. 4A, the dam modules prevent water flow through the dam system 10, such that the upstream flow of water 12 has an upstream water level 13 that is greater than a downstream water level 15 of the downstream flow of water 14. An amount of head of the dam system 10 may be based on a difference between the upstream water level 13 and the downstream water level 15.

Further Aspects and Implementations of a Penstock/Turbine Module

In some implementations, the system targets ROR hydropower projects, where by design, the available stream flow is primarily used for power generation with only limited reservoir storage needed. ROR projects are "water in/water our" and do not alter downstream flow regimes. Head is typically maintained at a relatively constant value under typical conditions. Limited impoundment minimizes any flooding of the land, displaces little or flora, fauna, or people, and no significant greenhouse gases (methane, in particular) are released as a result of flooding. Maintaining the natural stream flow also minimizes impacts on downstream aquatic life. A challenge of ROR projects is to match electrical output potential to stream flow. In some embodiments, one or more turbines are used to provide a broad efficiency curve for operation over much of the full range of the anticipated flow. Automated adjustments to the turbines and/or sequential activation/deactivation of multiple turbine units controls the amount of flow through the turbine(s) to match the river flow, and operating parameters maximize the available hydraulic power. In multi-turbine systems, the PLC brings turbines on and off line in succession to match flow conditions and optimize generation. As river flow increases, more water is passed through the turbines while the impoundment elevation remains constant. Spillway gates are operated during flood conditions when river flow exceeds the maximum capacity of the turbine system.

One module stack may be used to house a single turbine. At sites where multiple turbines are desired, multiple turbine modules may be deployed. These modules are oriented with their long axis parallel to the stream flow. Inflow to the vertically oriented turbine uses a "water box" configuration without the need for a penstock. The removable turbine/generator unit is submerged in the impoundment upstream of the stop shutters. The turbine/generator unit connects to an optimized draft tube which redirects flow in the downstream direction and enhances hydraulic efficiency. Seals and connections between containers or modules maintain the modularity. The seals and connections may only need to be designed once (perhaps with options for a handful of different turbine power ratings), and the resulting system reproduced developing an economy of scale.

The Flygt submersible turbine/generator system may be used for the COTS turbine in some embodiments. The Flygt systems have a range of sizes, most of which are dimensionally compatible with the turbine module configuration. The present solution may use other COTS turbines on the market including other bulb type turbines such as the Voith StreamDiver, Kaplan bulb turbines, (including the Type B Kaplan from Ossberger Hydro, and the Mavel bulb turbine), as well as so-called matrix turbines.

In some embodiments, the present solution may use advanced turbine technology, such as those using rim driven generators, which can have direct drive DC power output, and reduced lubrication and maintenance advantages. Based on or responsive to the turbine selection, a penstock and draft tube connection design may be used to support economic feasibility.

Referring now to FIGS. 5A-5E, the turbine module stack 200 is shown according to various embodiments of the present disclosure. As described previously, the turbine module stack 200 can include a first turbine module 200*a*, a second turbine module 200*b*, and a third turbine module 200*c*. The first turbine module 200*a* and second turbine module 200*b* can contain, house, hold and/or cooperate to contain, house, or hold the power generation unit 220.

In some embodiments, the power generation unit 220 can include or be similar to the Flygt turbine/generator system described herein. The power generation unit 220 can include a turbine 222 and a generator 224. The turbine 222 is configured to be rotated by the water in the dam system 10. The generator 224 is operatively coupled to the turbine 222 and configured to generate electricity responsive to rotation of the turbine 222.

The power generation unit 220 can be included in and/or installed in the turbine module stack 200 in various configurations. In some configurations, one or more of the turbine modules is dedicated to one or more components of the power generation unit 220. For example, the first turbine module 200*a* can have the turbine 222 installed prior to being delivered to the dam site, and the second turbine module 200*b* can have the generator 224 installed prior to being delivered to the dam site; the turbine 222 and generator 224 can be connected during installation of the dam system 10. In another example, the first dam module 200a and the second dam module 200b are configured to receive (e.g., cooperate to receive, contain, and/or house) the power generation unit 220 after the modules have been placed, such as by including openings for receiving the power generation unit 220 (e.g., the power generation unit 220 can be received via an opening in a side of the second turbine module 200b opposite the first turbine module 200a and then through an opening in a side of the first turbine module 200a facing the second turbine module 200b).

Referring further to FIG. 5D, in some embodiments, the turbine 222 includes one or more fins or blades 223 coupled to a rotor 226. The blades 223 are configured to rotate responsive to forces delivered from water flowing through the first turbine module 200a, in turn rotating the rotor 226. The generator 224 can include a stator 228 (e.g., a stator having coils configured to generate electricity as coils of the rotor 226 rotate within the stator 228). The rotor 226 can be a shaft coupled to the blades 223 and passing into the stator 228; the shaft may be a single shaft component or operatively coupled to rotate with one or more secondary shafts.

The turbine 222 and/or the blades 223 are configured to rotate about a rotational axis 221. In some embodiments, the rotational axis 221 is perpendicular to a direction of flow of water reaching the dam system 10 and leaving the dam system 10, and/or perpendicular to a bottom surface of the first turbine module 200a. For example, the turbine 222 can be oriented vertically relative to the turbine module stack 200.

In some embodiments, at least one of the first turbine module 200a or the second turbine module 200b includes a gate configured to control the flow of water to the first turbine module 200a (and thus to the power generation unit 220). An electronic controller may be configured to control operation of the gate based on a flow condition of the flow of water (e.g., flow rate, level). A closure bulkhead can be installed on an end of the first turbine module 200a (e.g., an upstream end facing the upstream flow of water 12) that is configured to selectively permit flow of water into the first turbine module 200a.

Figure 5A:
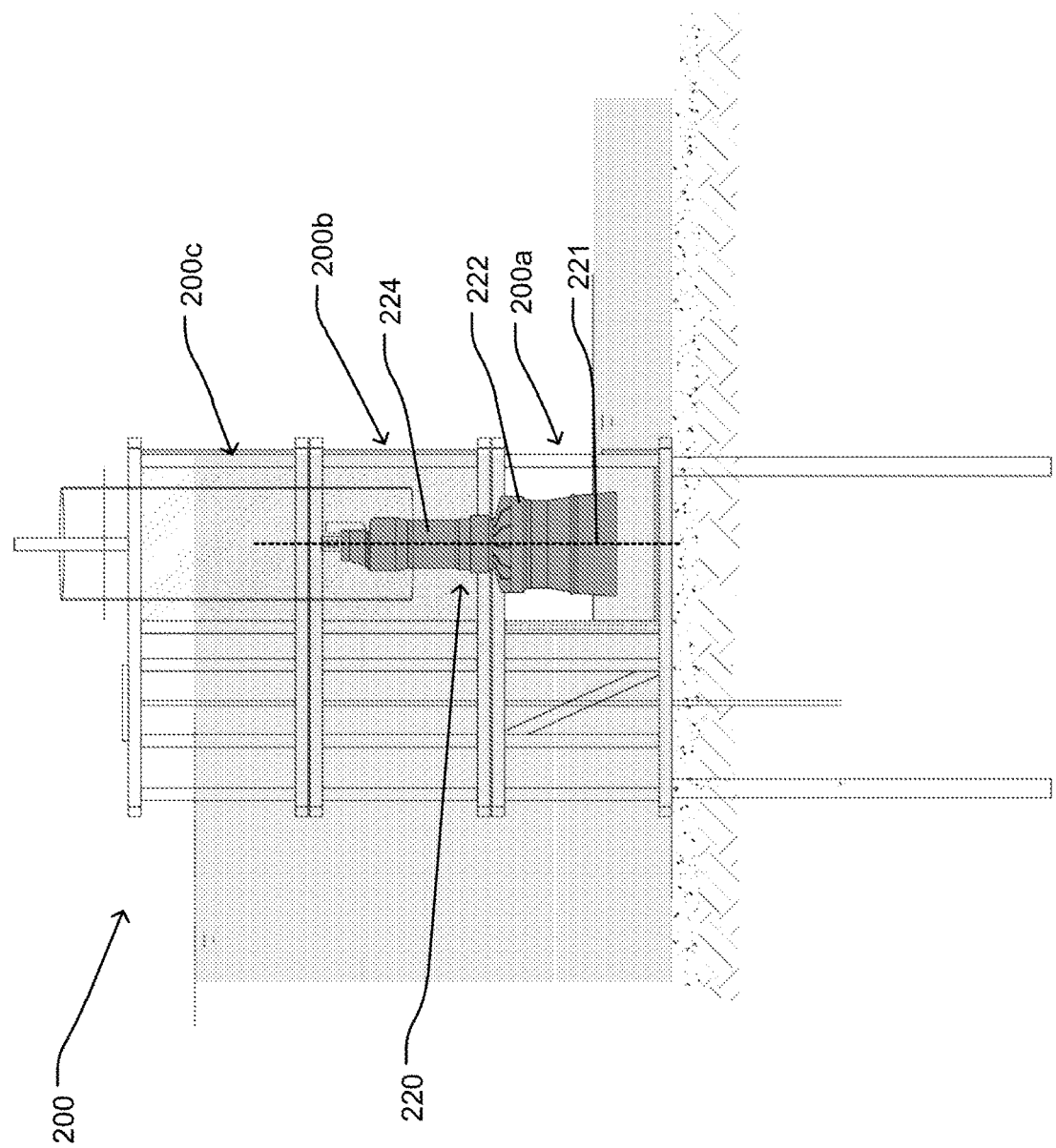
FIG. 5A is a side view of an embodiment of a turbine module stack of the modular dam system of FIG. 3A.
Figure 5E:
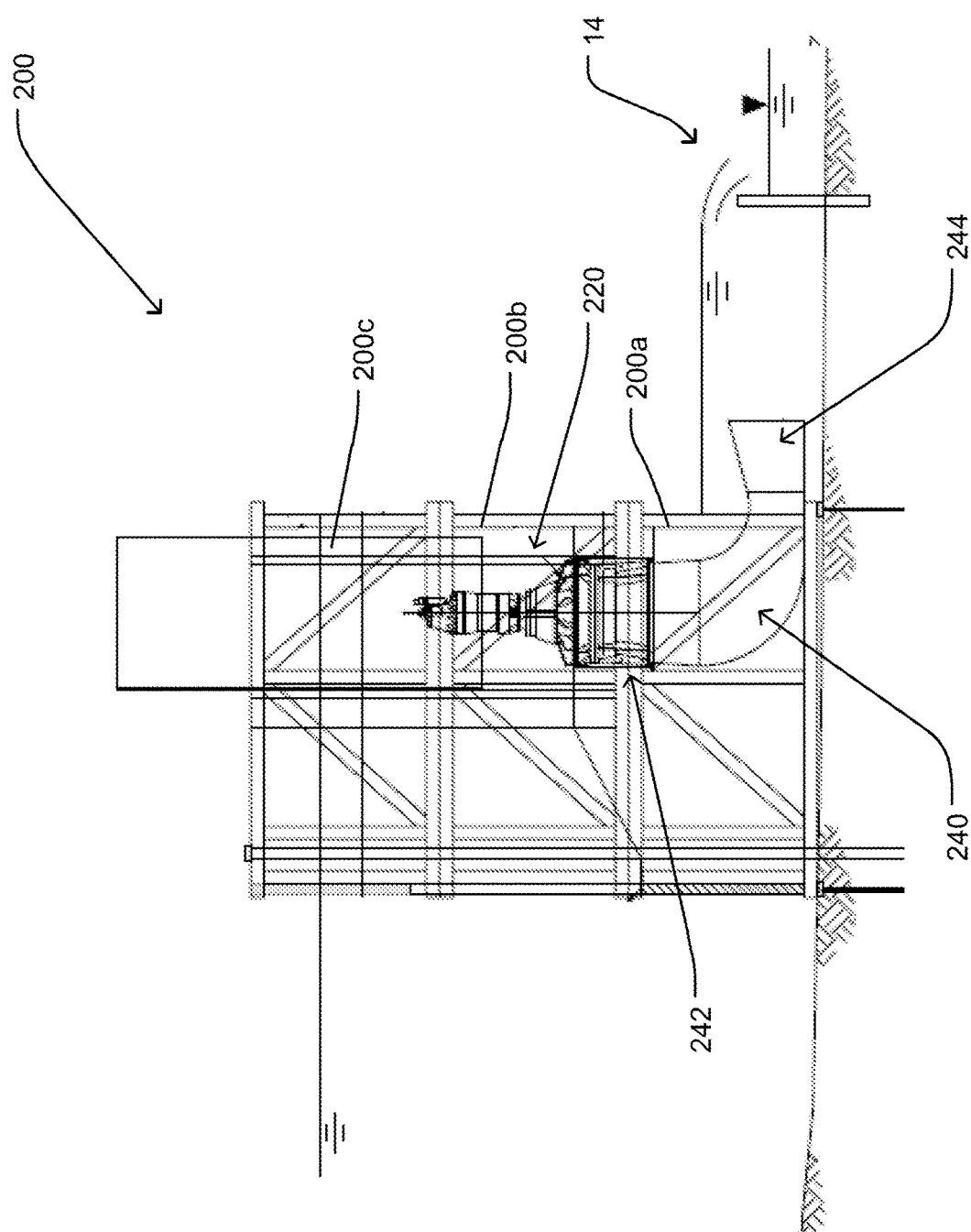
FIG. 5E is a side view of an embodiment of a turbine module stack including a draft tube of the modular dam system of FIG. 3A.

Referring further to FIG. 5E, in some embodiments, the turbine module stack 200 includes a draft tube 240. The draft tube 240 is configured to receive water from the turbine 222 (e.g., water driven out of the turbine 222 after causing the turbine 222 to rotate) and discharge the water from the first turbine module 200a. For example, the draft tube 240 can include a first tube end 242 facing or surrounding the turbine 222. The first tube end 242 can define an opening in a plane perpendicular to the rotational axis 221 (see, e.g., FIG. 5A). The draft tube 240 can extend from the first tube end 242 to a second tube end 244 from which water is discharged as the downstream flow of water 14. As shown in FIG. 5E, the draft tube 240 can be arranged to provide an approximately ninety-degree change of direction of water from the first tube end 242 to the second tube end 244.

In some embodiments, the turbine module stack 200 include a penstock. The penstock can be fluidly coupled to a first penstock opening on an upstream surface of the turbine module stack 200, and to the turbine 222 or a space around the turbine 222, to deliver water to the turbine 222.

Further Aspects and Implementations of a Spillway Module

Extreme hydrologic events must be able to pass over or through any dam structure without adverse impacts on the integrity and safety of the structure. In conventional dams, this process is accomplished through a combination of storage capacity behind the dam, and spillway structures constructed as an integral component of the dam structure. Failure to provide adequate storage and/or overflow capacity can lead to overtopping of the dam which can result in structural and/or geotechnical failures leading in turn to a dam collapse. In a typical ROR configuration, the storage capacity behind the dam is minimal so that all of the excess flow has to pass through the dam.

Figure 6A:
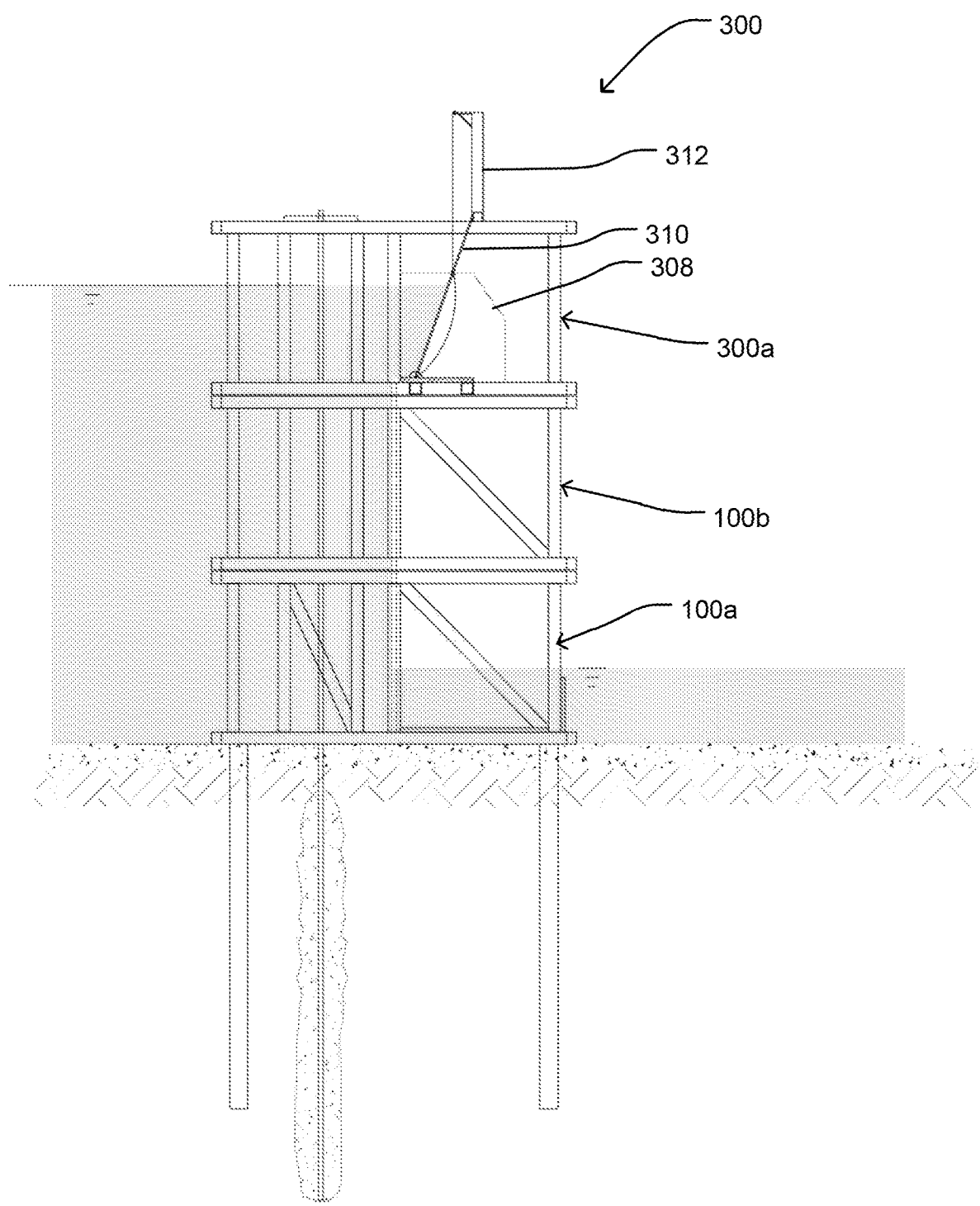
FIG. 6A is a side view of an embodiment of a spillway module stack of the modular dam system of FIG. 3A.

In some implementations of the system, modular spillway modules are configured to be placed on or secured to the second or third (top) tier of the dam structure. For example, the spillway module can be placed on or secured to the first dam module 100a, the second dam module 100b, the first turbine module 200a, or the second turbine module 200b. As shown in FIGS. 3A and 6A, the spillway module 300a is be placed on top of and/or secured to the second dam module 100b. The spillway module 300a can be configured based on at least one of conveyance attribute of the spillway module 300a (e.g., a relationship between flowrate through the spillway module 300a and an opening provided for water flow through the spillway module 300a) or a hydrologic analysis of the dam site.

This positioning allows controlled flow through the upper tier by built in pneumatic spillway gates (or other similar structures). The number of spillway modules is based on the hydrologic characteristics of the watershed. In embodiments of extreme cases, the modular design allows modules to be replaced to adjust the spillway capacity of the structure in response to upstream alterations or climate-change induced impacts to the hydrologic characteristics of the basin. This approach contrasts conventional dam construction, where spillways are constructed as an integral component of a fixed structure.

Figure 6B:
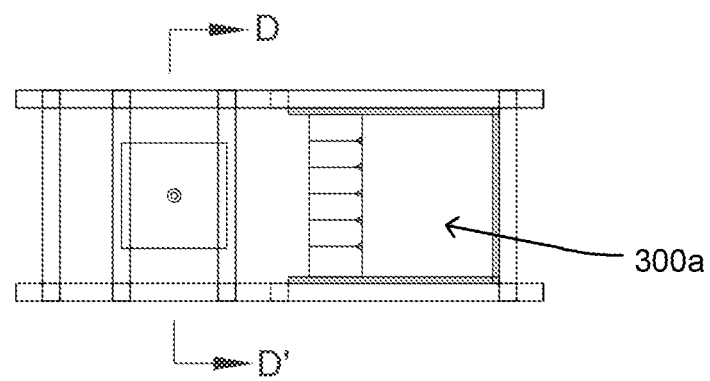
FIG. 6B is a plan view of an embodiment of the spillway module stack of FIG. 6A.
Figure 6C:
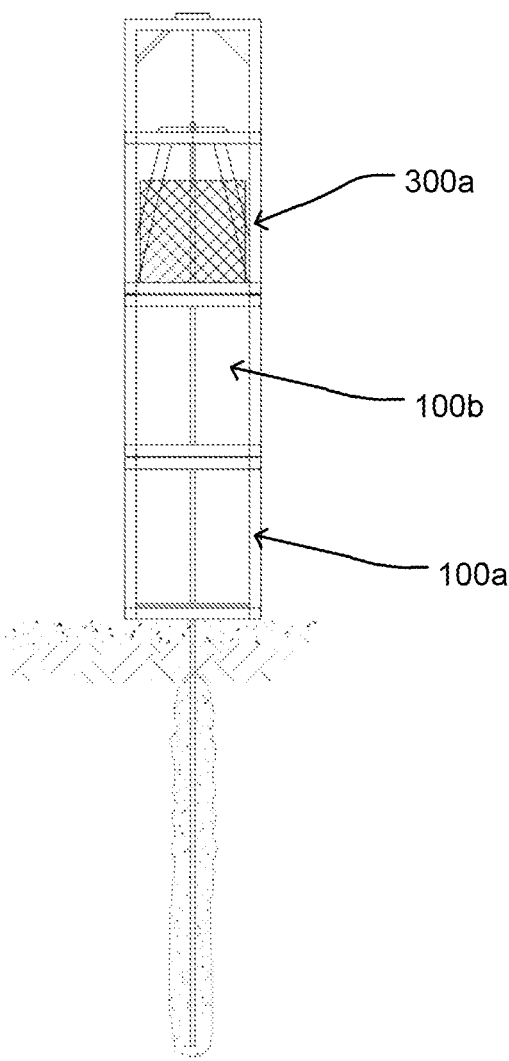
FIG. 6C is a section view of an embodiment of the spillway module stack of FIG. 6A.

In some implementations, the spillway modules are designed to open under extreme flow conditions, triggered either by head behind the dam reaching specified levels, or by integrating upstream flow gauges that predict increased flow. The number of spillway modules built into each site-specific design is based on the conveyance attributes of the spillway modules and a site-specific hydrologic analysis. Once conveyance is defined per module, simply including multiple spillway modules into the site-specific design generates the capacity for increased flows Referring now to FIGS. 6A-6C, the spillway module stack 300 is shown according to various embodiments of the present disclosure. The spillway module stack 300 can be formed by placing or securing the spillway module 300a on the dam module 100a or, as shown in FIG. 6A, the dam module 100b. The spillway module 300a is configured to control a level of water surrounding the dam system 10, such as by controlling a flow rate of water through the dam system 10.

In some implementations, the spillway module 300a includes a gate 310 configured to control the level of water surrounding the spillway module 300a. As a position and/or orientation of the gate 310 is modified, the flow rate of water through the gate 310 will vary. The dam system 10 can include a gate control mechanism 312. The gate 310 can be a fixed gate, a controlled gate, or a sluice gate. The gate 310 can be a pneumatic gate configured to be controlled responsive to pneumatic forces, or a hydraulic gate configured to be controlled responsive to hydraulic forces. The spillway module 300a can include a side seal plate 308 configured to seal a portion of the spillway module 300a.

Geotechnical Provisions and Other Aspects and Implementations of the Present Disclosure A water-impounding structure must be globally stable, internally competent, and capable of minimizing both leakage through and seepage under the structure. Referring back to FIGS. 3A-3C and FIG. 8, in some embodiments, structural stability is provided through an anchor system (e.g., an anchor system including anchor 422 and/or anchor assembly 420). In some embodiments, the anchor system includes an anchor 422 extending from a first anchor end 423 configured to be secured to the foundation to a second anchor end 424 configured to be secured to the anchor plate (e.g., a reaction plate) of a module, such as anchor plate 428 on the upper surface of dam module 100c. The anchor system can be implemented as a post-tensioned tie-down anchor that is drilled and grouted into the foundation and then secured against a reaction transfer system connecting the module stack to the anchor. The post-tensioning of this steel rod anchor can create a vertical (downward) force near the heel of the structure generating a "righting moment" in opposition to driving hydrostatic and uplift forces. The anchor system can include a corrosion resistant layer 429 on or around the anchor 422, improving stability for the dam system 10.

Figure 8:
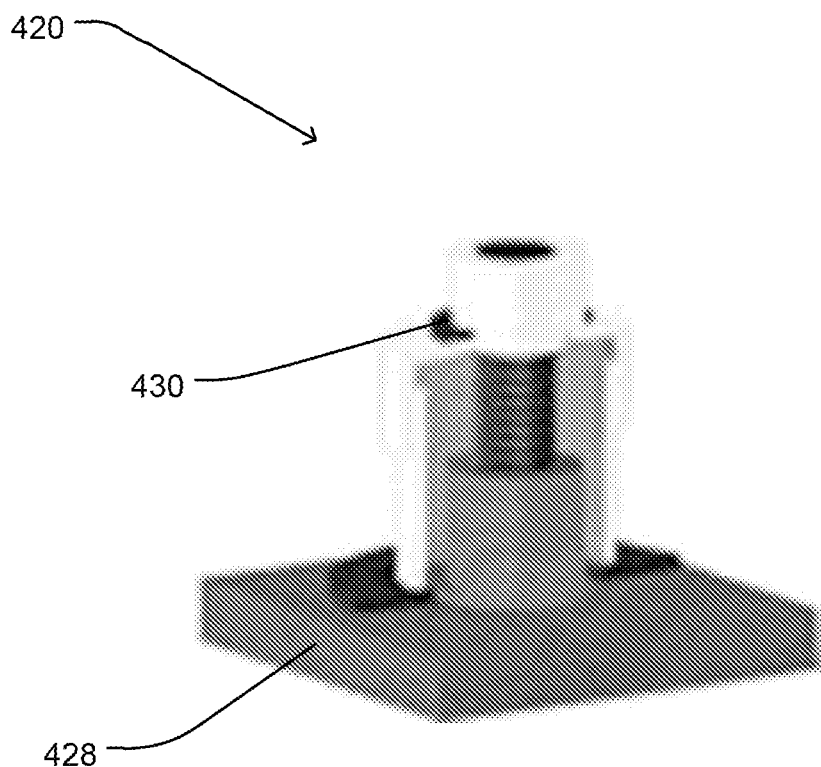
FIG. 8 is a diagram of an embodiment of a top reaction/bearing plate system.

An embodiment of a top reaction/bearing plate system is shown in FIG. 8. The anchor plate 428 can transfer forces received by the dam system 10 between the dam system 10 and the foundation. The reaction force is transferred via a load transfer plate onto module frame members 430 specifically designed to accommodate the large anchor load.

The size, shape, and configuration of the steel members which make up the module frame 101 can be pre-engineered to be compatible with the anchor load. Water impoundment is created through in installation of removable vertical stop shutters (e.g., shutters 110) in channels at the downstream face of each module stack. The stop shutter channels can be configured to be continuous between the modules of each stack to allow for stop shutters to be installed from the top of the dam system 10 after the anchor system has been fully installed.

Figure 7A:
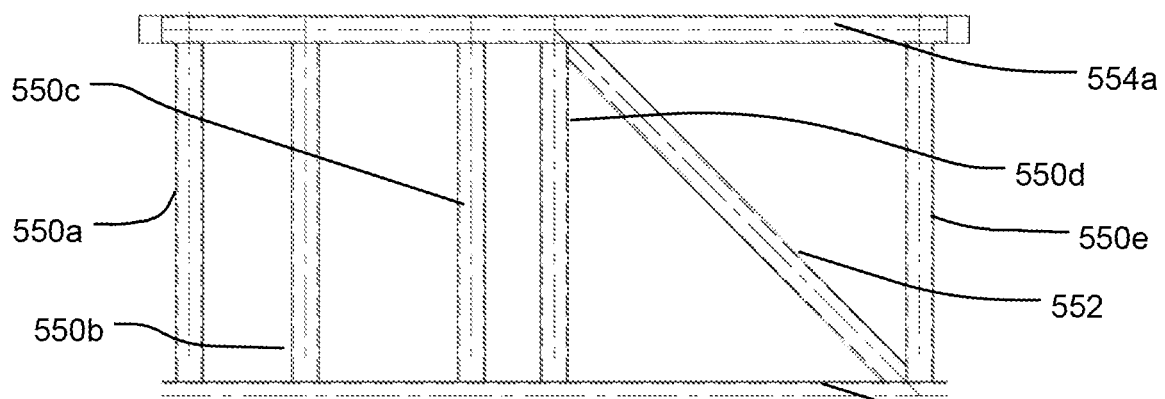
FIG. 7A is a side view of an embodiment of a dam module of the modular dam system of FIG. 3A.
Figure 7B:
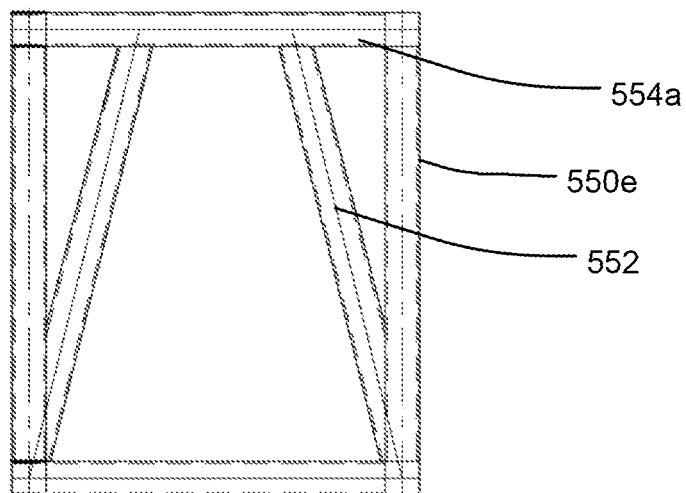
FIG. 7B is an end view of an embodiment of the dam module of FIG. 7A.
Figure 7C:
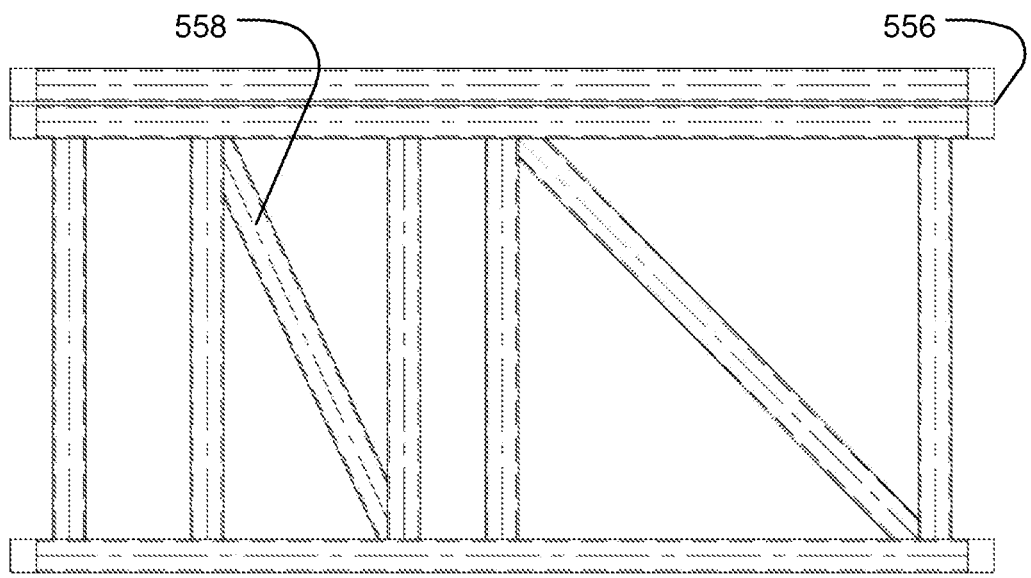
FIG. 7C is another side view of an embodiment of a dam module of the modular dam system of FIG. 3A.

For example, referring now to FIGS. 7A-7C, various embodiments of structures of the modules are shown. The modules can be structured to have a form factor analogous to existing ISO containers (e.g., conform to ISO 1496 standards), while also making the module frame 101 compatible with the loads on the dam system 10.

Referring to FIG. 7A, the top and middle modules (e.g., second dam module 100b, third dam module 100c, second turbine module 200b, third turbine module 200c, spillway module 300a) can include vertical members 550a, 550b, 550c, 550d, and 550e, angled member 552, and horizontal members 554a, 554b. A length of the horizontal members 554a, 554b can be sized to match a length of an ISO container, such as being approximately 20 feet (e.g., greater than or equal to 18 feet and less than or equal to 22 feet). A height of the vertical members 550a, 550b, 550c, 550d, and 550e can be sized to match a height of an ISO container, such as being approximately 9.5 feet (e.g., greater than or equal to 8 feet and less than or equal to 11 feet). A distance from an end of the horizontal member 554b to a centerline of the vertical members 550a, 550b, 550c, 550d, and 550e can be approximately (e.g., equal to; within 10%; within 20%) 1 foot 2 and ⅜ inches; 4 feet; 8 feet; 10 feet; and 18 feet 9 and ⅝ inches, respectively.

Referring to FIG. 7B, the angle members 552 can extend from corners where the vertical members 550e meet the horizontal member 554b, to the horizontal member 554a such that a distance between the angle members 552 at the horizontal member 554 is approximately 3 feet. The members can have widths of approximately 8 inches.

Referring to FIG. 7B, a gap 556 between the bottom module (e.g., first dam module 100a) and middle or top module (e.g., second dam module 100b) can be approximately 1 inch. As compared to the second dam module 100b or the third dam module 100c, the first dam module 100a can include an additional angle member 558, such as for providing additional support and stability.

In some embodiments, a compressible gasket of neoprene or similar material is used to make low-leakage seals for the container-to-container interface (joint). The compressible gasket can be sized to be positioned between modules, such as between the first dam module 100a and the second dam module 100b.

Figure 9:
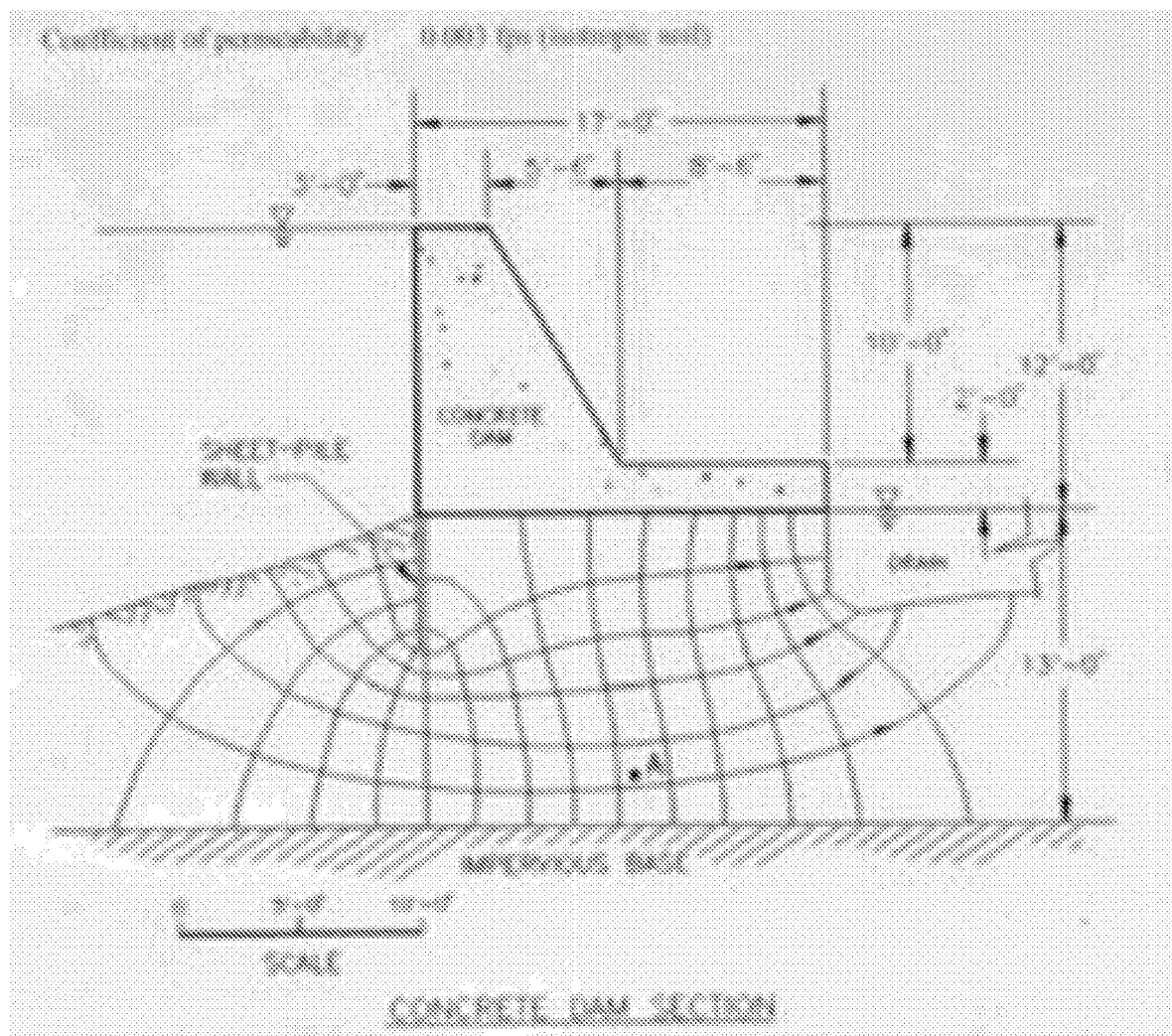
FIG. 9 is a graph of an embodiment of a flownet for seepage control for a modular dam system.

Seepage through the foundation under the containers is a function of site-specific subsurface conditions. For soil foundations, sheet pile cutoffs are used. These are a standard and well understood seepage control approach in dam engineering as indicated in the schematic diagram in FIG. 9 showing seepage control for a dam system such as modular dam system 10. The baseline concept includes upstream and downstream lines of sheeting; the depth is dependent on the nature of the foundation soils (i.e., granular or cohesive). The downstream sheeting line both lengthens seepage flow paths and protects the toe of the structure against undermining by scour.

While each existing dam site or potential new development location is unique, the modular nature of the dam system 10 is uniquely adaptable such that it can be configured for a wide range of topographic and subsurface conditions. The present solution furthers the development of design guidelines to facilitate the selection of structural and seepage control components based on a number of pre-analyzed potential scenarios. This approach provides for both cost and schedule advantages over traditional hydropower system construction methods.

Figure 10:
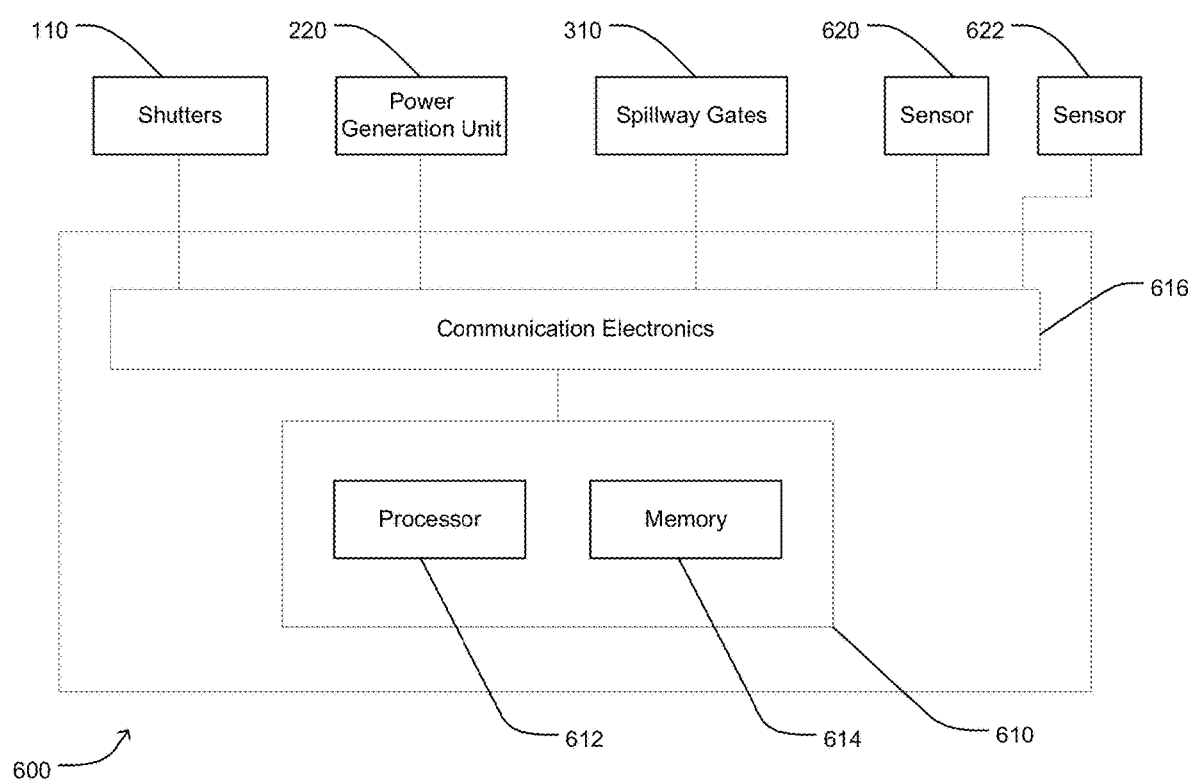
FIG. 10 is a schematic diagram of an embodiment of a control system for controlling components of the modular dam system of FIG. 3A.

Referring now to FIG. 10, a control system 600 for controlling operation of the dam system 10 is illustrated. The control system 600 includes an electronic controller 610 (e.g., a processing circuit, processing electronics) which can be communicatively coupled to various components of the dam system 10, including the power generation units 220, the shutters 110, the spillway gates 310 (or various mechanisms configured to actuate, control, or move such components), and/or a water condition sensor 620. The electronic controller 610 can include a processor 612 and a memory 614. The processor 612 may be, or include, one or more microprocessors, application specific integrated circuits (ASICs), or more field programmable gate arrays (FPGAs), circuits containing one or more processing components, a group of distributed processing components, circuitry for supporting a microprocessor, or other hardware configured for processing. The memory 614 is one or more devices (e.g., RAM, ROM, flash memory, hard disk storage) for storing data and computer code for completing and facilitating the various processes described in the present disclosure. The memory 614 may be or include volatile memory or non-volatile memory and may include database components, object code components, script components, or any other type of information structure for supporting the various activities and information structures of the concepts disclosed herein. The memory 614 is communicably connected to the processor 612 and includes computer code or instruction modules for executing one or more processes described herein. The memory 614 can include various circuits, software engines, and/or modules that cause the processor 612 to execute the systems and methods described herein. The electronic controller 610 can be a programmable logic controller, and can be configured to control a plurality of components (e.g., a plurality of power generation units 220).

The control system 600 can include communication electronics 616. The communications electronics 616 can be configured to facilitate electronic communication between the electronic controller 610 (and any of the components therein) and remote devices or data sources such as electronic components of the power generation unit 210, the shutters 110, and/or the spillway gates 310. The communication electronics 616 can include wired or wireless interfaces and hardware as appropriate for facilitating electronic communication, including transmission and reception of electronic signals amongst the components of the control system 600. The communications electronics 616 can be or include one or more receiver hardware, transmitter hardware, and/or transceiver hardware.

The control system 600 can include one or more flow condition sensors 622. The flow condition sensor 622 can be a flowmeter, a level sensor, or other devices positioned and configured to detect conditions of water flow in and around the dam system 10, such as levels of the upstream flow of water 12 or the downstream flow of water 14, or flow rates of the upstream flow of water 12 of the downstream flow of water 14.

The electronic controller 610 can be configured to control operation of the power generation unit 220, the shutters 110, and/or the spillway gates 310 based on factors such as a level of water, a flow rate of water, a power efficiency curve of the turbine 222, and/or a target electricity generation rate. While FIG. 10 depicts the electronic controller 610 as being a centralized controller, in various embodiments, various components of the dam system 10 can have distributed, modular, dedicated, and/or local control electronics configured to perform functions specific to the component (e.g., the spillway gates 310 can have a local controller configured to control the spillway gate based on a detected water flow condition).

Figure 11:
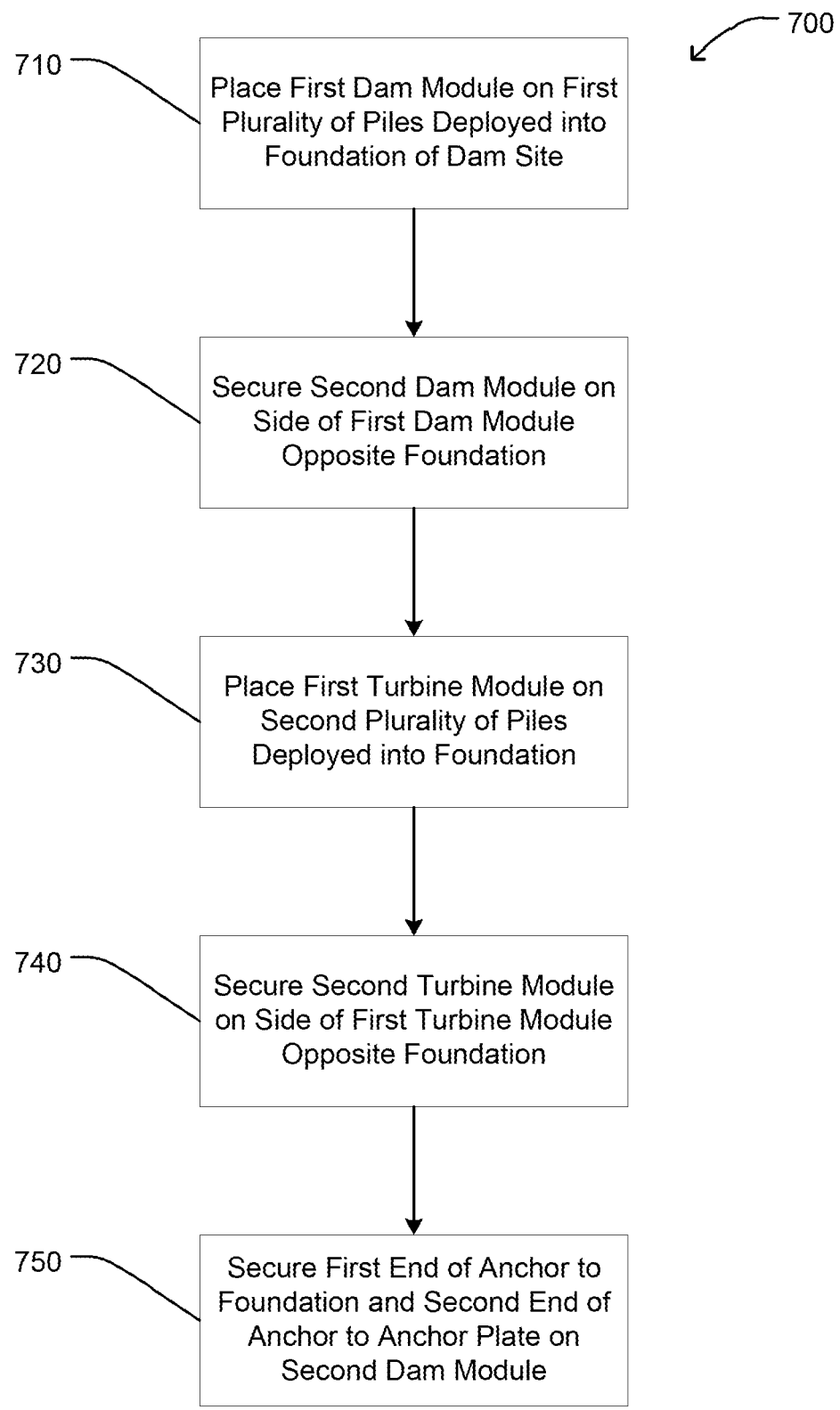
FIG. 11 is a block flow diagram of an embodiment of a method of installing a modular dam system.

Referring now to FIG. 11, a method 700 of installing a modular dam system is shown. The method 700 or steps thereof can be performed by a variety of actors, including contractors, utility companies, shipping and transportation companies, and other parties involved in dam construction and management. The method 700 can be performed for installing the dam system 10 as described according to various implementations herein.

At 710, a first dam module is placed on a first plurality of piles deployed into a foundation of a dam site. The first dam module is configured to redirect a first flow of water from a first surface of the first dam module.

At 720, a second dam module is secured on a side of the first dam module opposite the foundation. The second dam module is configured to redirect a second flow of water from a second surface of the second dam module.

At 730, a first turbine module is placed on a second plurality of piles deployed into the foundation of the dam site. The first turbine module is configured to receive a third flow of water to generate electricity. The third flow of water at least partially includes at least one of the first flow of water or the second flow of water redirected by the respective dam module. The first turbine module includes a draft tube having a tube inlet and a tube outlet oriented perpendicular to a bottom surface of the first turbine module to discharge water from the first turbine module.

At 740, a second turbine module is secured on a side of the first turbine module opposite the foundation. At 750, a first end of an anchor is secured to the foundation, and a second end of the anchor is secured to an anchor plate on a side of the second dam module opposite the foundation. In some embodiments, securing the second end of the anchor to the anchor plate includes tensioning the anchor using a temporary jack and locking the second end of the anchor to the anchor plate.

In some embodiments, the method includes securing at least one of a third dam module or a first spillway module to a side of the second dam module opposite the first dam module. The third dam module is configured to prevent a fourth flow of water through the at least one third dam module. The first spillway module includes a gate configured to control a level of water surrounding the spillway module. The at least one spillway module can be configured based on at least one of a conveyance attribute of the spillway module or a hydrologic analysis of the dam site.

In some embodiments, the method includes installing a closure bulkhead on a first turbine end of the first turbine module (e.g., an upstream face of the first turbine module). The closure bulkhead can be configured to selective permit the third flow of water into the first turbine module.

The method can include installing a top access platform across a side of the second dam module and the second turbine module opposite the first dam module and the first turbine module. The top access platform can allow personnel to move across the dam system and/or access modules of the dam system from above.

In some embodiments, the method includes installing a tailrace sheet pile check weir. The check weir can be installed on a downstream side of the dam system. The check weir can be configured to receive a discharge flow of water from the first turbine module.

The method can include installing a power generation unit in the turbine modules. For example, the turbine modules can include openings configured to receive the power generation unit. The power generation unit can be fluidly coupled to a draft tube for discharging water that has driven a turbine of the power generation unit to a downstream side of the dam system. The method can include connecting an electrical connection to the power generation unit and commissioning the power generation unit.

In some embodiments, the method includes determining whether a depth of water downstream of the first turbine module is less than a threshold value to maintain a submergence level for the first turbine module. Responsive to determining that the depth of water is less than the threshold value, the method can include installing a plurality of piles downstream of the first turbine module to increase the depth of water.

In some embodiments, the first modules (e.g., first dam module, first turbine module) are placed in a first layer. The second modules (e.g., second dam module, second turbine module, spillway module) can be placed in a second layer on top of the first layer. A third layer (e.g., a third dam module, a third turbine module, a spillway module) can be placed on top of the second layer.

Figure 12:
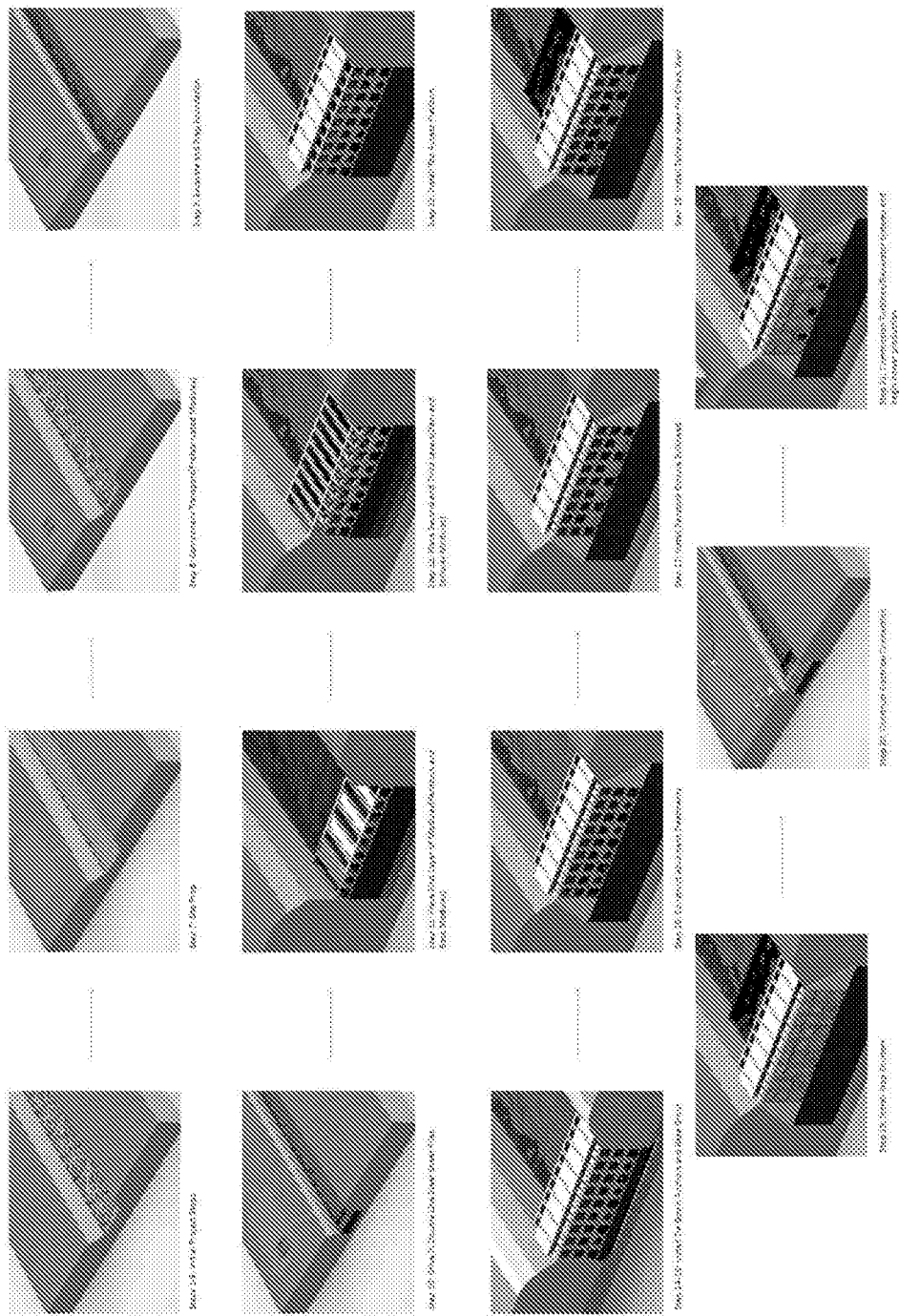
FIG. 12 is a schematic diagram of an embodiment of an installation sequence for a modular dam system.

Referring now to FIG. 12, an embodiment of a method of installing a modular dam system is shown, identifying various steps that may be performed by various actors. The steps include initial project steps, site preparation, component transport (e.g., transport of prefabricated modules), excavation and preparation of foundation, installation of piles (e.g., driving in double line steel sheet piles), placing a first layer of modules (e.g., penstock or turbine modules and base modules such as first dam modules), placing second and third layers of modules (e.g., dam and spillway modules), installing a top access platform, installing tie down anchors and base grout, constructing abutment treatments, installing penstock or turbine closure bulkheads, installing a tailrace sheet pile check weir, installing stop shutters, construction an electrical connection, and/or commissioning power generation units (e.g., turbine and generator units) to begin power production.

The present disclosure contemplates methods, systems, and program products on any machine-readable media for accomplishing various operations, such as for controlling operation of the various systems and apparatuses described herein, or for executing programs or other instructions using processing electronics or other electronic control hardware. A control systems hub can include a processor and can include a memory. The embodiments of the present disclosure may be implemented using existing computer processors, or by a special purpose computer processor for an appropriate system, incorporated for this or another purpose, or by a hardwired system. Embodiments within the scope of the present disclosure include program products comprising machine-readable media for carrying or having machine-executable instructions or data structures stored thereon. Such machine-readable media can be any available media that can be accessed by a general purpose or special purpose computer or other machine with a processor. By way of example, such machine-readable media can comprise RAM, ROM, EPROM, EEPROM, CD-ROM or other optical disk storage, magnetic disk storage or other magnetic storage devices, or any other medium which can be used to carry or store desired program code in the form of machine-executable instructions or data structures and which can be accessed by a general purpose or special purpose computer or other machine with a processor. When information is transferred or provided over a network or another communications connection (either hardwired, wireless, or a combination of hardwired or wireless) to a machine, the machine properly views the connection as a machine-readable medium. Thus, any such connection is properly termed a machine-readable medium. Combinations of the above are also included within the scope of machine-readable media. Machine-executable instructions include, for example, instructions and data which cause a general purpose computer, special purpose computer, or special purpose processing machines to perform a certain function or group of functions.

Although the figures may show a specific order of method steps, the order of the steps may differ from what is depicted. Also two or more steps may be performed concurrently or with partial concurrence. Such variation will depend on the software and hardware systems chosen and on designer choice. All such variations are within the scope of the disclosure. Likewise, software implementations could be accomplished with standard programming techniques with rule based logic and other logic to accomplish the various connection steps, processing steps, comparison steps and decision steps.

While various aspects and embodiments have been disclosed herein, other aspects and embodiments will be apparent to those skilled in the art. The various aspects and embodiments disclosed herein are for purposes of illustration and are not intended to be limiting.

What is claimed is:

1. A system, comprising:
    a first dam module having a first side configured to be secured to a foundation of a dam site, the first dam module configured to redirect a first flow of water from a first surface of the first dam module;
    a second dam module configured to be secured to a second side of the first dam module opposite the foundation, the second dam module configured to redirect a second flow of water from a second surface of the second dam module;
    a power generation unit;
    a first turbine module having a third side configured to be secured to the foundation; and
    a second turbine module configured to be secured to a fourth side of the first turbine module opposite the foundation, the first turbine module and the second turbine module cooperating to contain the power generation unit;
    the power generation unit including a turbine configured to be driven by a third flow of water, the third flow of water at least partially including at least one of the first flow of water or the second flow of water redirected by the respective dam module, and a generator configured to generate electricity responsive to motion of the turbine, the turbine oriented to rotate about a rotational axis perpendicular to the third side of the first turbine module, the first turbine module further comprising a draft tube having a tube inlet oriented to receive water from the turbine and a tube outlet oriented perpendicular to the rotational axis to discharge water from the first turbine module.

2. The system of claim 1, further comprising a spillway module configured to be secured to an upper surface of at least one of the second dam module or the second turbine module, the spillway module comprising a gate configured to control a level of water surrounding the spillway module.

3. The system of claim 1, wherein at least one of the first turbine module or the second turbine module comprises a gate configured to control the flow of water to the first turbine module.

4. The system of claim 3, further comprising an electronic controller configured to control operation of the gate based on a flow condition of the flow of water.

5. The system of claim 1, wherein each module comprises a shipping container configured to contain the respective module.

6. The system of claim 5, wherein the shipping container has a form factor corresponding to an ISO container.

7. The system of claim 1, wherein the first side of the first dam module includes a concrete slab, the system further comprising a plurality of piles connected to the concrete slab and configured to be secured to the foundation.

8. The system of claim 1, further comprising an anchor extending from a first anchor end configured to be secured to the foundation to a second anchor end configured to be secured to an anchor plate of the second dam module.

9. The system of claim 1, further comprising an electronic controller configured to control operation of the turbine based on at least one of a flow condition of the flow of water or a level of the flow of water.

10. The system of claim 1, further comprising a compressible gasket sized to be positioned between the first dam module and the second dam module.

11. A method of installing a modular dam system, comprising:
    placing a first dam module on a first plurality of piles deployed into a foundation of a dam site, the first dam module configured to redirect a first flow of water from a first surface of the first dam module;

securing a second dam module on a side of the first dam module opposite the foundation, the second dam module configured to redirect a second flow of water from a second surface of the second dam module;

placing a first turbine module on a second plurality of piles deployed into the foundation of the dam site, the first turbine module configured to receive a third flow of water to generate electricity, the third flow of water at least partially including at least one of the first flow of water or the second flow of water redirected by the respective dam module, the first turbine module including a draft tube having a tube inlet and a tube outlet oriented perpendicular to a bottom surface of the first turbine module to discharge water from the first turbine module;

securing a second turbine module on a side of the first turbine module opposite the foundation; and securing a first end of an anchor to the foundation and a second end of the anchor to an anchor plate on a side of the second dam module opposite the foundation.

12. The method of claim 11, further comprising securing at least one of a third dam module or a first spillway module to a side of the second dam module opposite the first dam module, the third dam module configured to prevent a fourth flow of water through the at least one third dam module, the first spillway module comprising a gate configured to control a level of water surrounding the spillway module.

13. The method of claim 12, wherein the at least one spillway module is configured based on at least one of a conveyance attribute of the spillway module or a hydrologic analysis of the dam site.

14. The method of claim 11, further comprising installing a closure bulkhead on a first turbine end of the first turbine module, the closure bulkhead configured to selectively permit the third flow of water into the first turbine module.

15. The method of claim 11, further comprising installing a top access platform across a side of the second dam module and the second turbine module opposite the first dam module and the first turbine module.

16. The method of claim 11, further comprising installing a tailrace sheet pile check weir configured to receive a discharge flow of water from the first turbine module.

17. The method of claim 11, wherein the first turbine module and the second turbine module cooperate to contain a power generation unit including a turbine configured to be rotated by the flow of water and a generator configured to generate the electricity responsive to the rotation of the turbine, the method further comprising connecting an electrical connection to the power generation unit and commissioning the power generation unit.

18. The method of claim 11, wherein securing the second end of the anchor to the anchor plate comprises tensioning the anchor via a temporary jack and locking the second end of the anchor to the anchor plate.

19. The method of claim 11, further comprising:
determining whether a depth of water downstream of the first turbine module is less than a threshold value to maintain a submergence level for the first turbine module; and
responsive to determining that the depth of water is less than the threshold value, installing a plurality of piles downstream of the first turbine module to increase the depth of water.

20. The method of claim 11, wherein placing the first dam module and placing the first turbine module comprises placing the first dam module and the first turbine module in a first layer, and securing the second dam module and securing the second turbine module comprises placing the second turbine module and placing the second turbine module in a second layer.

* * * * *